(12) United States Patent
Smadja et al.

(10) Patent No.: US 10,141,885 B2
(45) Date of Patent: Nov. 27, 2018

(54) FLOATING SOLAR PANEL SYSTEMS

(71) Applicant: 4CSOLAR, Inc., Toulouse (FR)

(72) Inventors: Liliane Smadja, Chateau-Landon (FR); Paul Isaac Smadja, Chateau-Landon (FR)

(*) Notice: Subject to any disclaimer, the term of this patent is extended or adjusted under 35 U.S.C. 154(b) by 306 days.

(21) Appl. No.: 14/955,278

(22) Filed: Dec. 1, 2015

(65) Prior Publication Data
US 2016/0156304 A1  Jun. 2, 2016

Related U.S. Application Data

(60) Provisional application No. 62/086,146, filed on Dec. 1, 2014.

(51) Int. Cl.
| | | |
|---|---|---|
| *H01L 31/042* | (2014.01) | |
| *H02N 6/00* | (2006.01) | |
| *H02S 20/00* | (2014.01) | |
| *B63B 35/44* | (2006.01) | |
| *B63B 7/08* | (2006.01) | |
| *H02S 30/10* | (2014.01) | |
| *H02S 40/36* | (2014.01) | |

(52) U.S. Cl.
CPC .............. *H02S 20/00* (2013.01); *B63B 7/08* (2013.01); *B63B 35/44* (2013.01); *H02S 30/10* (2014.12); *H02S 40/36* (2014.12); *B63B 2035/4453* (2013.01); *Y02E 10/50* (2013.01)

(58) Field of Classification Search
CPC .......... H02S 20/00; H02S 40/36; H02S 30/10; B63B 7/08; B63B 35/44
See application file for complete search history.

(56) References Cited

U.S. PATENT DOCUMENTS

| | | | |
|---|---|---|---|
| 4,350,143 A | 9/1982 | Laing | |
| 5,452,678 A * | 9/1995 | Simpkins | ............... B63B 17/02 114/361 |
| 7,063,036 B2 | 6/2006 | Han | |
| 7,891,351 B2 | 2/2011 | Hinderling | |
| 7,954,322 B2 * | 6/2011 | Henderson | ........... B01D 1/0035 60/641.8 |
| 8,056,554 B2 | 11/2011 | Hinderling | |

(Continued)

FOREIGN PATENT DOCUMENTS

| | | |
|---|---|---|
| EP | 2299499 B1 | 6/2010 |
| JP | 3172424 U | 6/2011 |

OTHER PUBLICATIONS

Hann-Ocean Hexifloat System, online magazine PV-Magazine.com (http://www.pv-magazine.com/archive/articles/beitrag/the-power-flower-_100002749/329/#axzz3t6DttdDo), circa May 2011.

*Primary Examiner* — Angelo Trivisonno
(74) *Attorney, Agent, or Firm* — Guy Cumberbatch

(57) ABSTRACT

A floating solar system having a peripheral buoyant pontoon within which is suspended an array of individual photovoltaic panels each equipped with a float. A stabilizing skirt drops down into the water underneath the pontoon and creates a more placid "moon pool" within the pontoon to reduce turbulence from wave action and therefore enhance the efficiency of the array of photovoltaic panels. A plurality of the floating solar systems may be aggregated to form an island of units. The individual panels or rows or columns thereof may be flat (horizontal) or tilted so that they can be oriented more normally with regard to the sun's rays.

20 Claims, 27 Drawing Sheets

(56) References Cited

U.S. PATENT DOCUMENTS

| | | |
|---|---|---|
| 8,176,868 B2 | 5/2012 | Han |
| 8,183,457 B2 | 5/2012 | Morgal |
| 8,502,454 B2 * | 8/2013 | Sadwick ............ H05B 33/0809 |
| | | 315/291 |
| 2005/0028524 A1 | 2/2005 | Laing |
| 2007/0283999 A1 | 12/2007 | Yekutiely |
| 2008/0194160 A1 * | 8/2008 | Concannon ............ A01K 75/04 |
| | | 441/22 |
| 2008/0257398 A1 | 10/2008 | Laing |
| 2009/0133732 A1 | 5/2009 | Hsia |
| 2009/0314926 A1 | 12/2009 | Hinderling |
| 2010/0037887 A1 * | 2/2010 | Hinderling .............. B63B 35/44 |
| | | 126/600 |
| 2010/0059046 A1 | 3/2010 | Hinderling |
| 2010/0132695 A1 * | 6/2010 | Hinderling ................ F24J 2/07 |
| | | 126/646 |
| 2011/0291417 A1 | 12/2011 | Han |
| 2012/0305051 A1 | 12/2012 | Kokotov |
| 2013/0146127 A1 | 6/2013 | Lunoe |
| 2013/0240025 A1 * | 9/2013 | Bersano ................. F24J 2/5241 |
| | | 136/251 |
| 2014/0034110 A1 | 2/2014 | Yang |

* cited by examiner

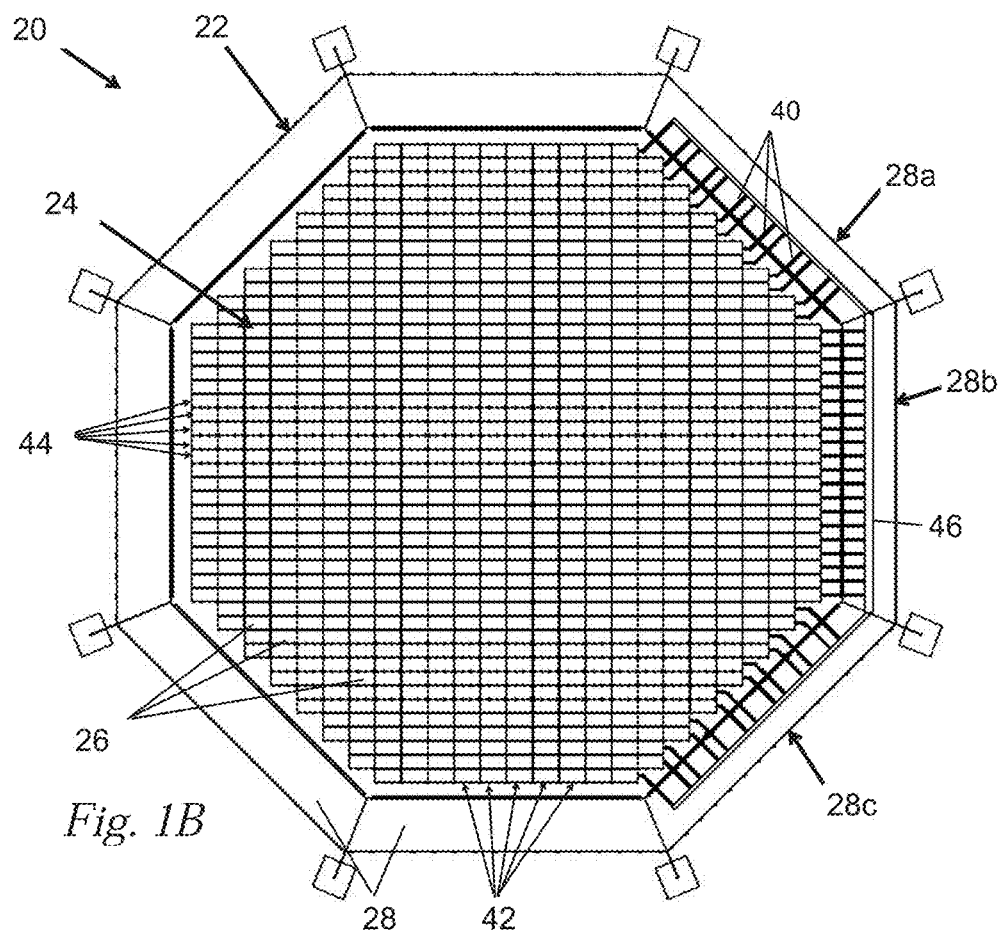
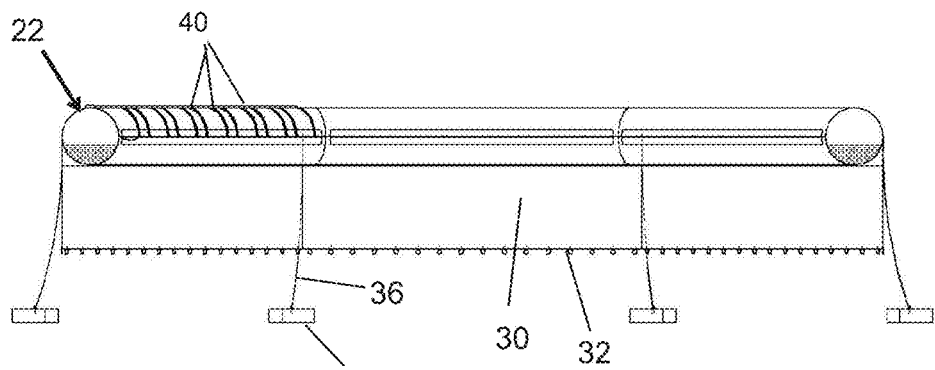
Fig. 1B
Fig. 1C

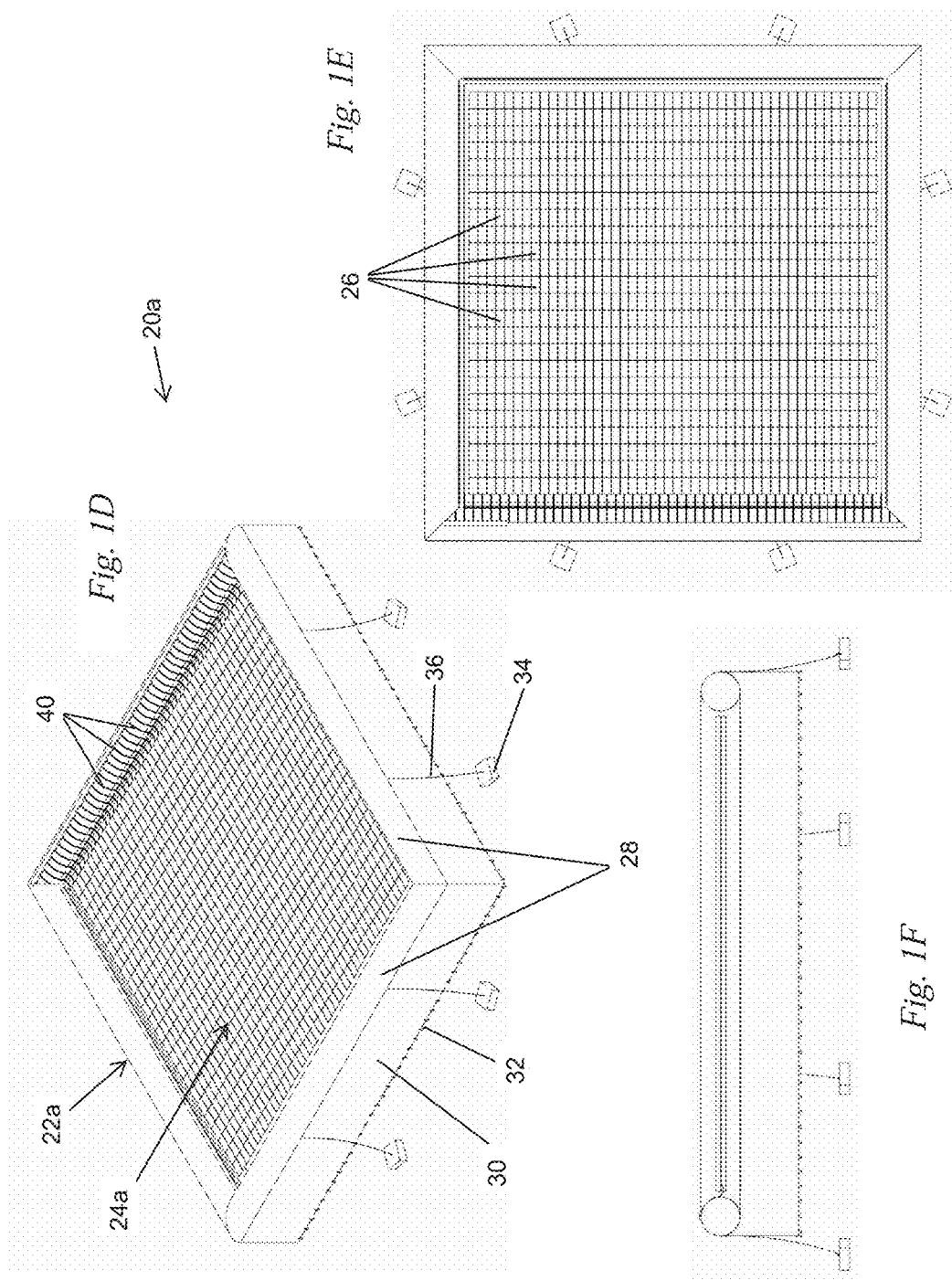

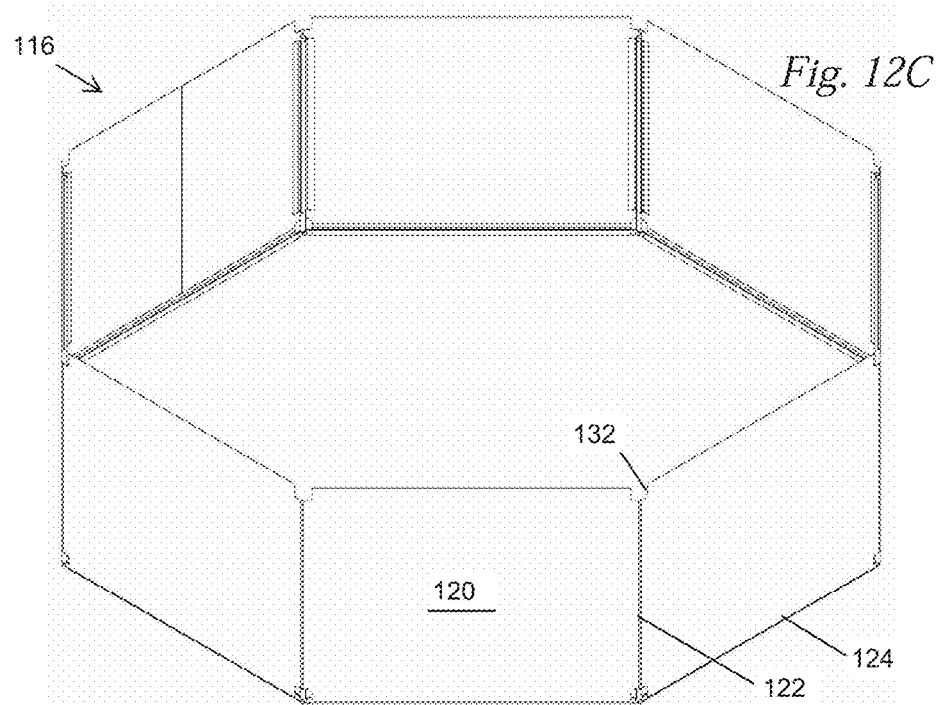
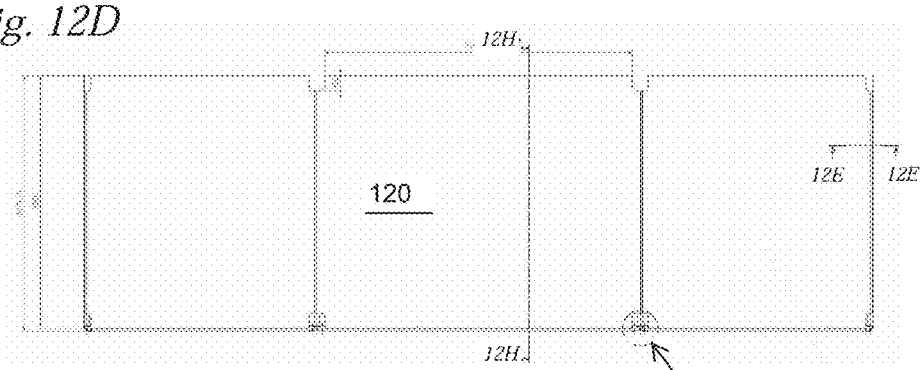
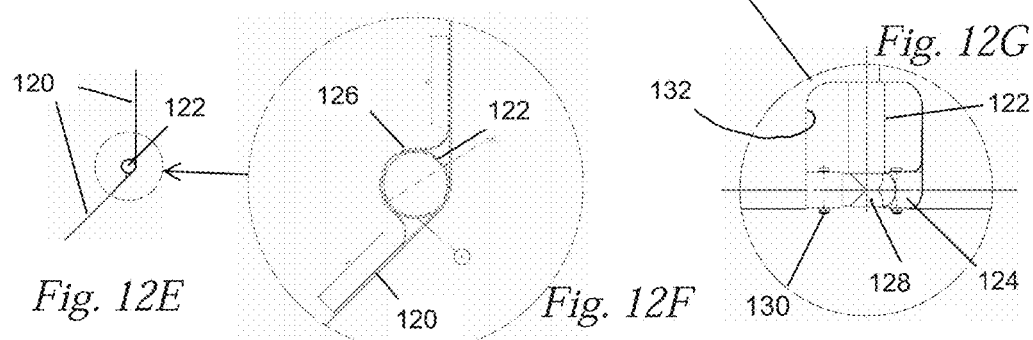

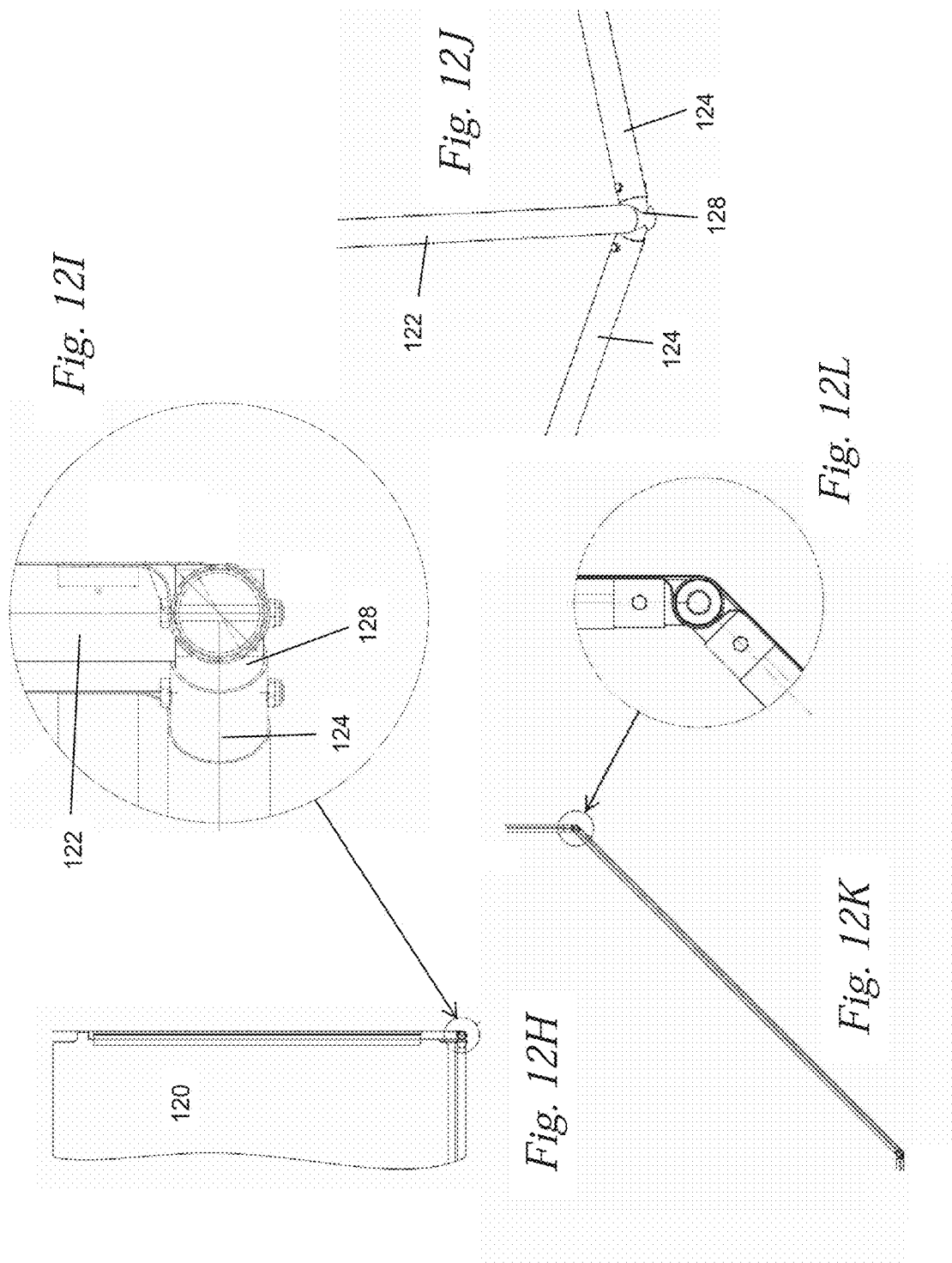

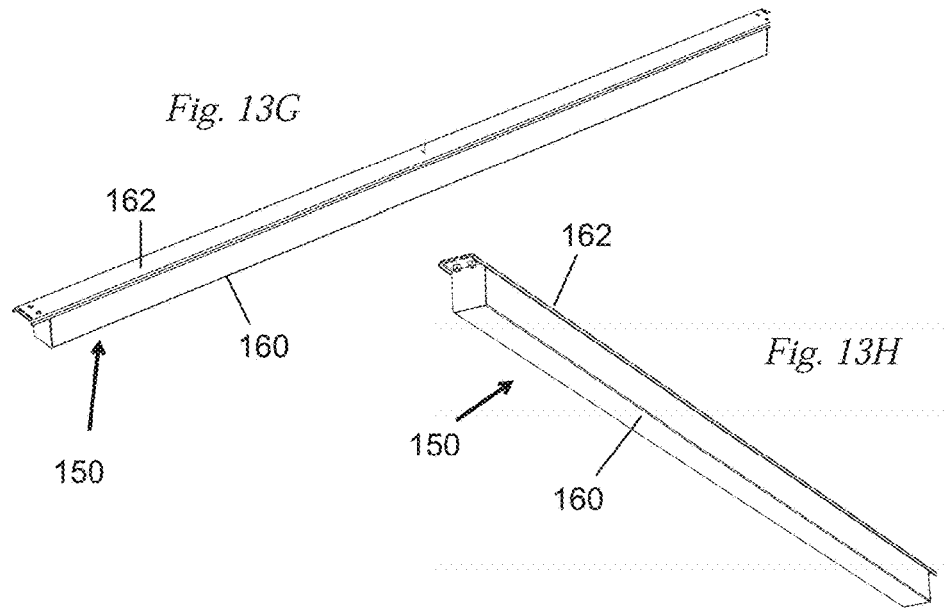
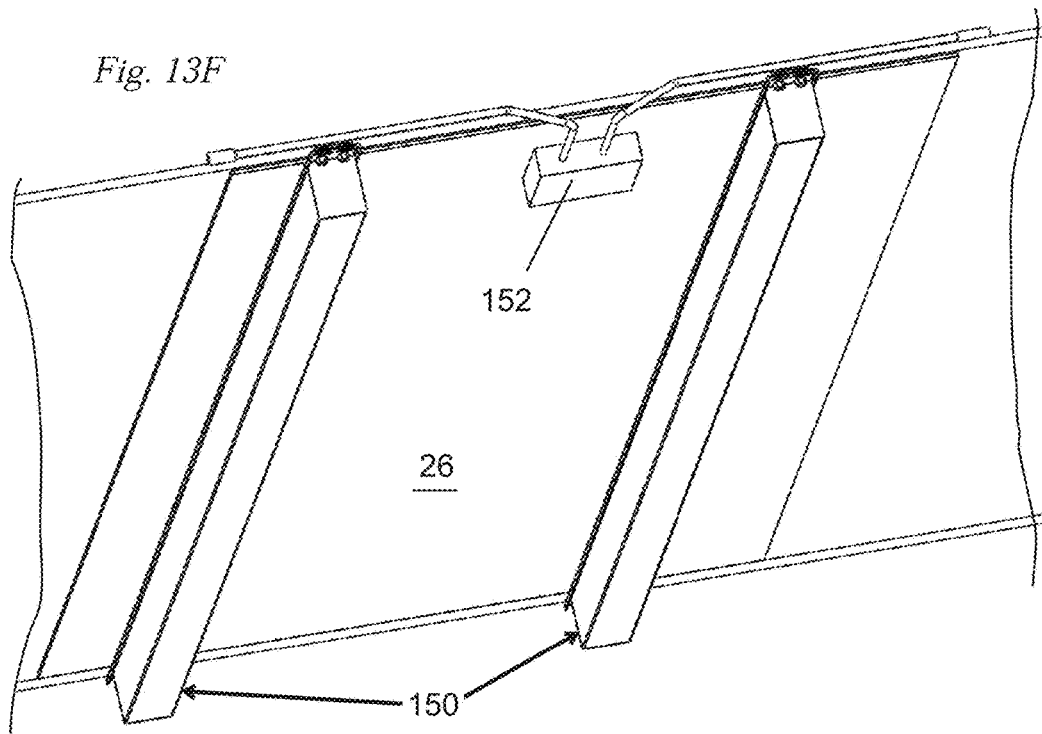

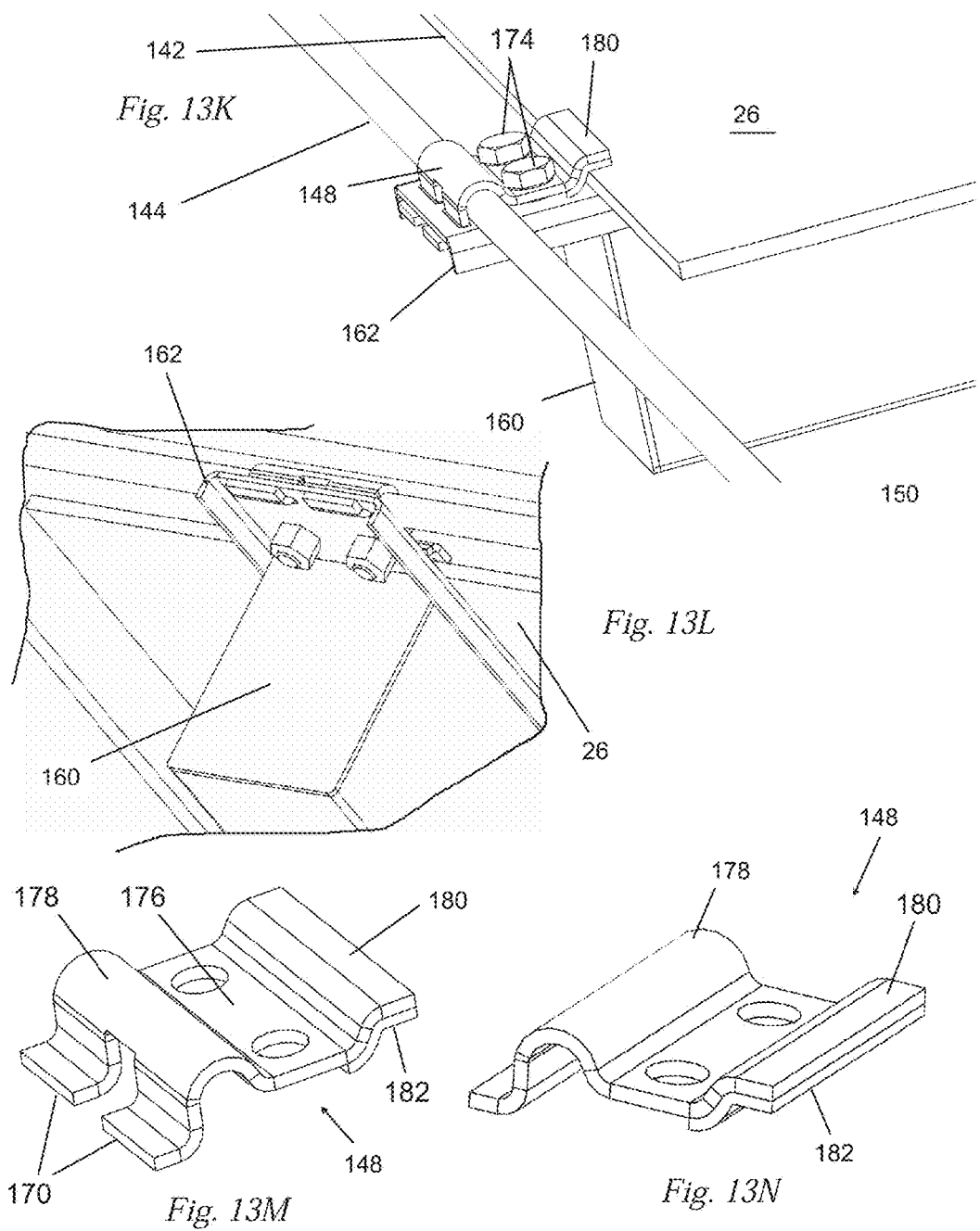

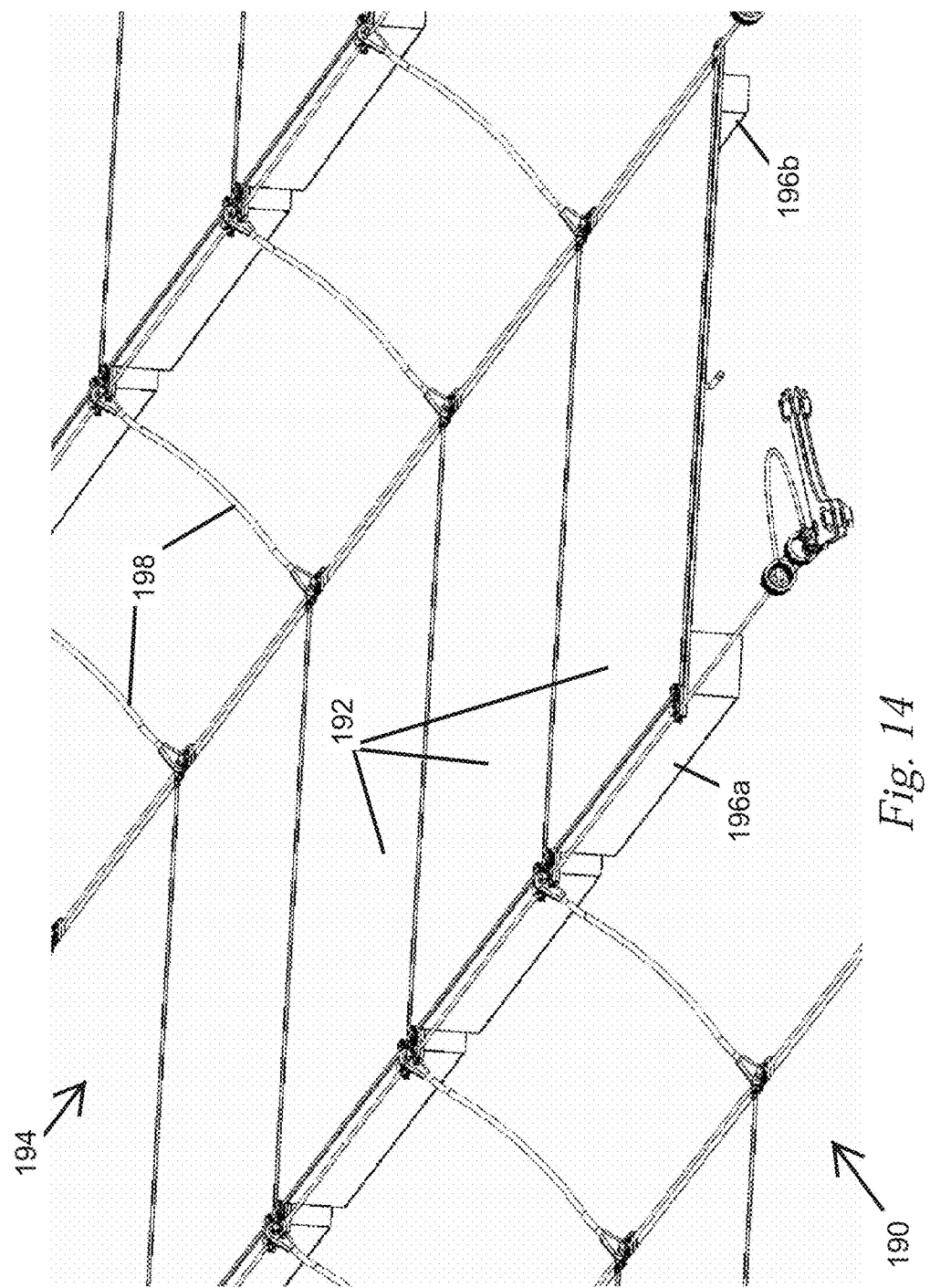

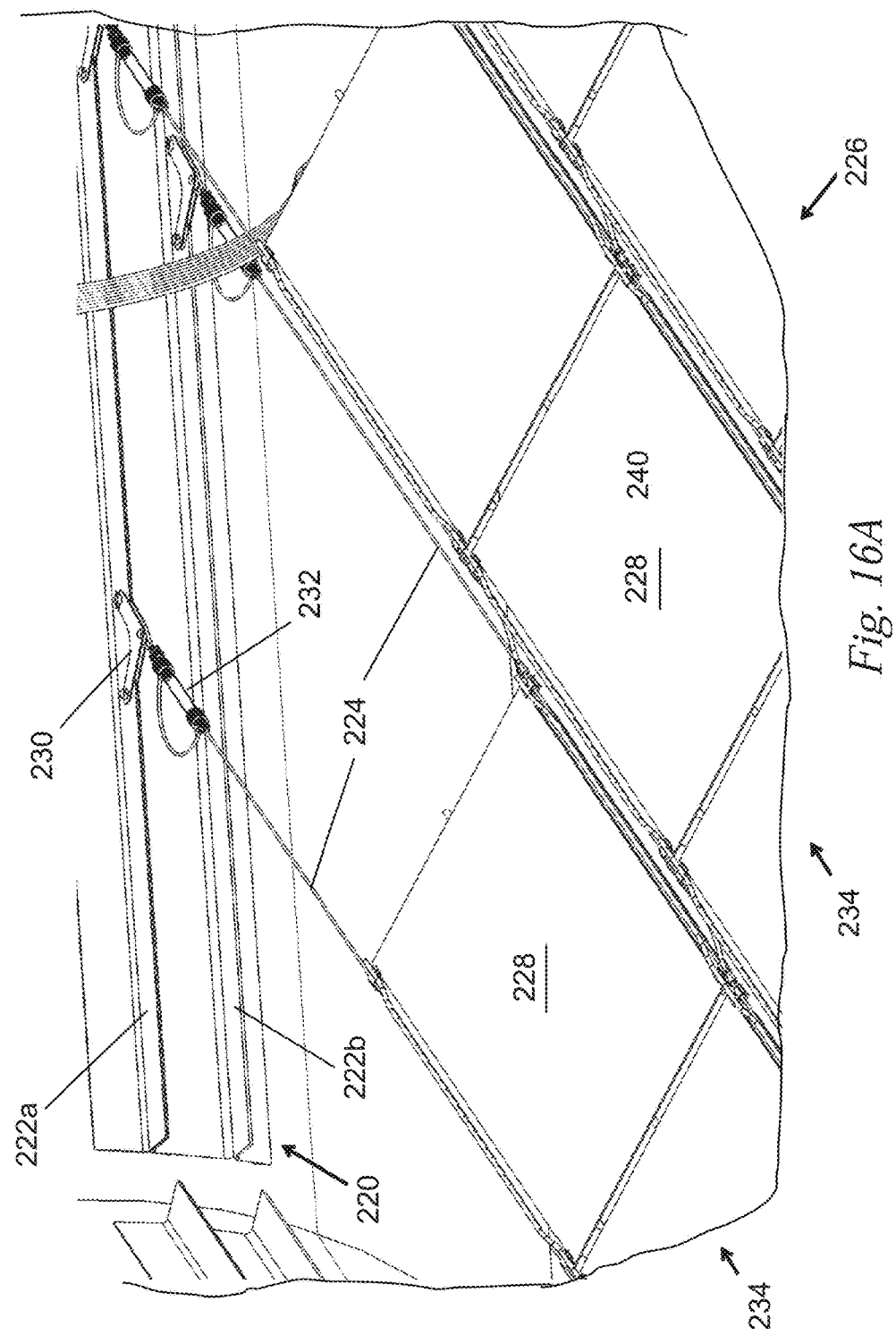

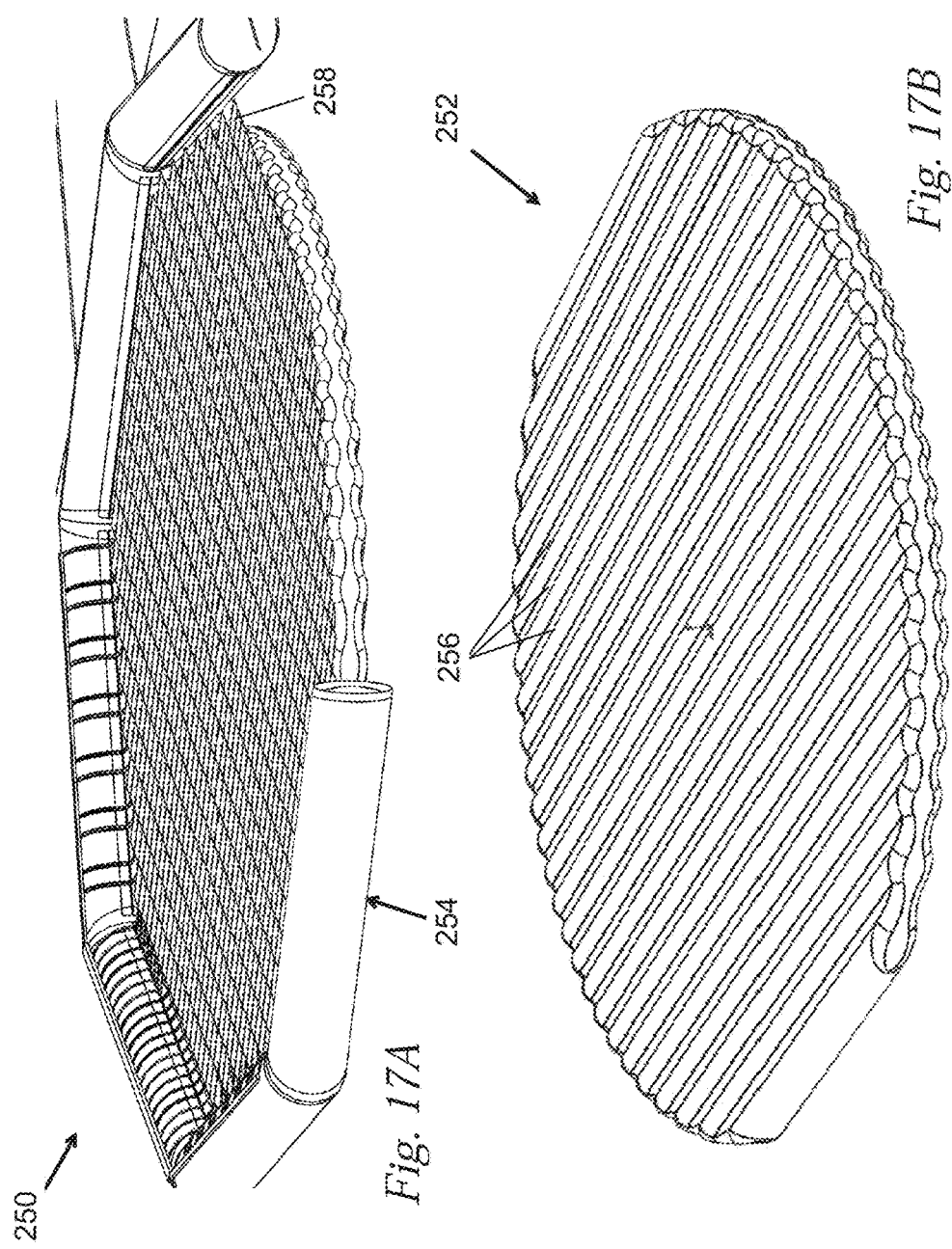

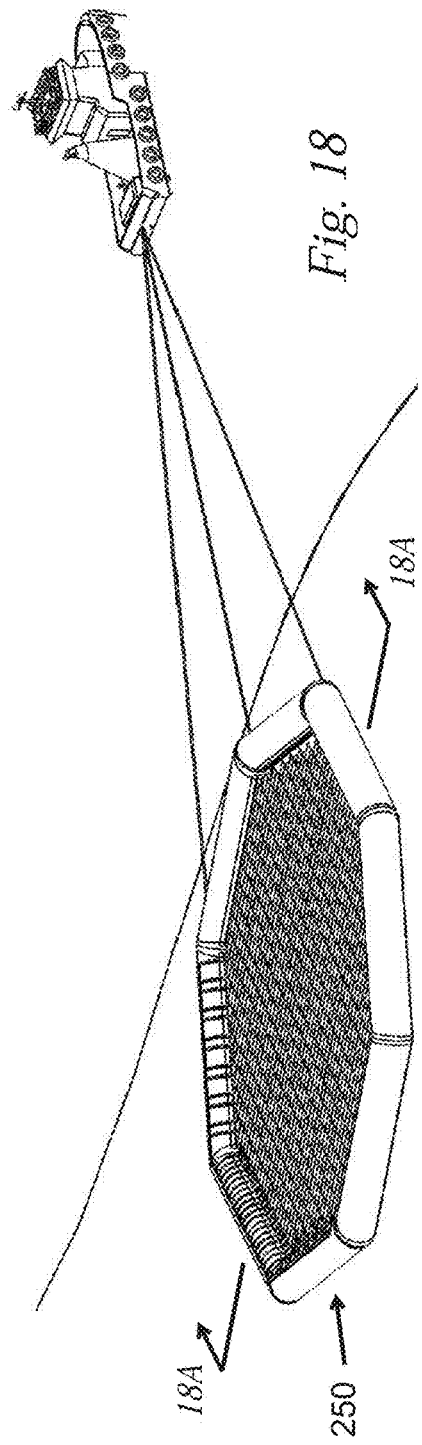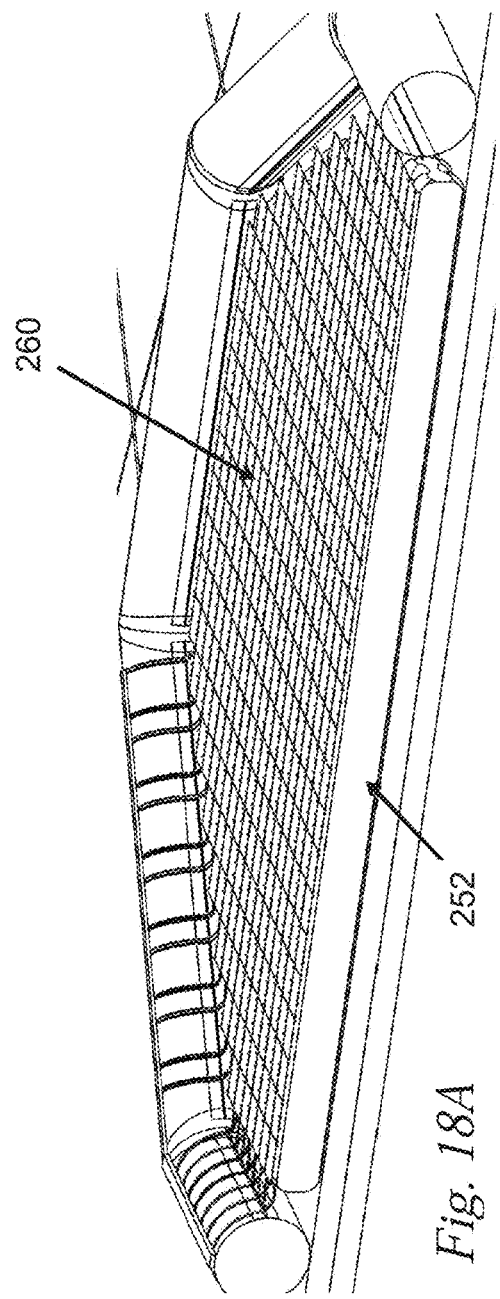

FLOATING SOLAR PANEL SYSTEMS

RELATED APPLICATIONS

The present application claims priority under 35 U.S.C. § 119 to U.S. Provisional Ser. No. 62/086,146, filed Dec. 1, 2014.

FIELD OF THE INVENTION

The present application pertains to photovoltaic systems and, more particularly, to systems of floating solar panels and floats therefor that reduce wave motion.

BACKGROUND OF THE INVENTION

During the next decades, the generation of sustainable energy will become one of the main challenges of our civilization. Worldwide energy demand is expected to grow from about 10 GTep ($10^{10}$ Tep [Ton Equivalent Petrol], or $5*10^{19}$ Joule) in the beginning of the century to 15-20 GTep by 2050. Some scenarios predict even levels as high as 40 GTep. An analysis of future global petrochemical consumption needs (i.e. energy needs and/or raw material for chemical industry) implies that early petrol shortages might already appear in the mid of the century. The need for large scale renewable energy sources is underlined by the global warming due to increasing $CO_2$ levels which is a by-product of the energy generation process using any kind of fossil fuel.

These predictions have stimulated rapid growth in the development of renewable energy. Wind farms, hydroelectric power plants, thermal power stations, and solar power plants all need a certain area of land, which is costly and can negatively affect the environment.

Solar energy is a clean and inexhaustible natural resource and one of the most promising renewable energy. An estimated 10,000 GTep of solar radiation reaches the earth every year, while perhaps only 5 GTep of usable solar power would be needed to make a significant step toward global energy sustainability. However, for solar power plants to offer the same generating capacity and supply stability as traditional power plants, the required land area is enormous.

Ocean accounts for about ¾ of the total area of the Earth. In order to efficiently use the available surface area, therefore, solar power could be moved to oceans or lakes, improving the utilization of land while preserving human living space and land for agriculture. Consequently, floating solar arrays have generated great interest in recent years. One discussion of this technology appears in "Solar Islands: A new concept for low-cost solar energy at very large scale," posted by Francois Cellier on May 20, 2008 in The Oil Drum: Europe (http://europe.theoildrum.com/node/4002). Other designs appear in the patent databases, such as in U.S. Pat. Nos. 4,350,143; 7,063,036; 7,891,351; 8,176,868; and 8,183,457; and in U.S. Patent Publication Nos. 2007/0283999; 2008/0257398; 2009/0314926; 2011/0291417; 2012/0305051; 2013/0146127; and 2014/0034110.

Despite much study, there remains a need for a floating photovoltaic system which can overcome the problem encountered in the prior art.

SUMMARY OF THE INVENTION

This application presents a floating device allowing solar photovoltaic panels to float on the sea surface with reduced wave motions. The solar panels are self-supported thanks to one or several extruded floats, such as polystyrene, attached on the bottom side of the panels. The wave motions are reduced thanks to a float around the solar array, made of a combination of a buoy or pontoon and a skirt. The buoy can have a circular or polygonal peripheral shape. The buoy can be constituted of a unique buoy, or by the association of several buoys (for example, 4 buoys for a rectangular or square shaped buoy, or 8 buoys for an octagonal shaped buoy). The buoy can be inflatable, or made of one or several high density tubes, such as polyethylene, equipped or not with additional floating devices used typically for dredging applications. The float has also a relatively rigid skirt around it to allow the float to behave like a "moon pool" device, and thus to reduce wave motions inside the buoy. The skirt is weighted to remain substantially vertical in the water and form a barrier around the column of water so as to create a calm sea with highly reduced waves within the peripheral shape and prevents the wind from lifting up the buoy. The rigidity of the skirt can be attained, for example, with horizontal and vertical tubes inserted in the skirt. The photovoltaic panels will be either floating on the sea water in a horizontal position, held with cables and brackets, or in an inclined position to angle the panels toward the sun.

An exemplary floating solar system comprises a border pontoon adapted to float on water defining a closed peripheral shape surrounding an interior space. An array of interconnected photovoltaic panels distributed within the peripheral shape are structurally supported by support cables extending across between sides of the pontoon so as to span the interior space, each photovoltaic panel having a flotation device secured thereto so that the array is at least partially buoyant, and the photovoltaic panels being electrically connected. A stabilizing skirt depends downwardly from the border pontoon to surround a column of water underneath the array of photovoltaic panels, the skirt being weighted to remain substantially vertical in the water and forming a barrier around the column of water so as to create a more stable volume of water (a "moon pool") within the peripheral shape that outside of the border pontoon. The peripheral shape is preferably a polygon such as a square or octagon. The photovoltaic panels may be angled from the horizontal such as providing differently-sized flotation devices under each. In a preferred embodiment, the flotation device comprises at least one elongated float attached underneath each photovoltaic panel. Alternatively, the flotation devices comprise buoys that are attached to the cables between photovoltaic panels.

The photovoltaic panels of the above system may be attached with elongated metallic tracks attached in parallel to one edge of the panels. Preferably, the photovoltaic panels, the elongated metallic tracks, and the support cable are connected with a bracket having a convex portion that is sized to closely receive the support cable, and to secure the support cable with respect to the metallic tracks and the photovoltaic panel. Furthermore, the bracket may also include a bent flange on its inner end that rests on top of the photovoltaic panel, with a strip of resilient material such as rubber to adhere between the underside of the flange and the upside of the photovoltaic panel.

The stabilizing skirt is desirably rigidified with horizontal and vertical tubes, though the vertical tubes may be flexibly connected to the horizontal tubes so as to allow the skirt to deform with the sea currents. In one version, the skirt has a depth that is between about 10-40% of the width of the closed peripheral shape. The pontoons may be tubular members made of high density polyethylene or tubular inflatable members. The pontoons comprises tubular members may be partly filled with water for ballast. A series of UV light ropes may extend within gaps between individual photovoltaic panels and supported by the support cables.

An alternative floating solar system comprises a border pontoon adapted to float on water defining a closed peripheral shape surrounding an interior space. An array of interconnected photovoltaic panels are structurally connected together within the peripheral shape, each photovoltaic panel having a flotation device secured thereto so that the array is at least partially buoyant, the photovoltaic panels being electrically connected. A stabilizing skirt depends downwardly from the border pontoon to surround a column of water underneath the array of photovoltaic panels, the skirt having a plurality of struts supporting solid vertical panels therebetween. The struts are made of a material having a higher density than water, and the skirt thus forms a barrier around the column of water and creates a more stable volume of water within the peripheral shape that outside of the border pontoon.

BRIEF DESCRIPTION OF THE DRAWINGS

Features and advantages of the present invention will become appreciated as the same become better understood with reference to the specification, claims, and appended drawings wherein:

FIGS. 1A-1C are perspective and orthogonal views of an exemplary floating solar system comprising a border pontoon defining a closed octagonal peripheral shape surrounding an interior space in accordance with the present application;

FIGS. 1D-1F are perspective and orthogonal views of another floating solar system comprising a border pontoon defining a closed square peripheral shape;

FIG. 14 is a perspective view of an alternative array of photovoltaic panels with sequential rows configured to tilt in one direction for greater sun exposure;

FIGS. 16A-16C are perspective views of a series of UV light ropes extending within gaps between individual photovoltaic panels and supported by interconnecting cables;

FIG. 17A shows a step in assembly of the floating solar systems and FIG. 17B shows a corrugated mattress used in assembling the floating solar systems; and FIG. 18 is a schematic view showing a tug boat deploying one of the floating solar systems, and FIG. 18A is a sectional view through the floating solar system showing the corrugated mattress inflated under the array of photovoltaic panels.

DETAILED DESCRIPTION OF THE PREFERRED EMBODIMENTS

The present application discloses a number of floating solar units or systems each having a peripheral buoyant pontoon within which is suspended an array of individual photovoltaic panels. A stabilizing skirt drops down into the water underneath the pontoon and creates a more placid "moon pool" within the pontoon to reduce turbulence from wave action and therefore enhance the efficiency of the array of photovoltaic panels. A plurality of the floating solar systems may be aggregated to form an island of units. It should be understood that the various aspects of the floating solar systems may be interchanged and combined in many ways, and that none are excluded. The scope of the invention being defined only by the appended claims.

The floating solar systems may be deployed in any body of water large enough to receive them. The size of the units may vary from relatively small (10 meters wide) to quite large. An exemplary floating solar system has an outer diameter of about 40 to 80 meters, meaning the most suitable sites for deployment are in large lakes, seas or the ocean. Indeed, if multiple floating solar systems of 80 meters wide are connected, the overall size is huge, and the vast areas of the ocean are preferred. As such, the advantages of the stabilizing skirt to mitigate ocean wave motion will be appreciated. For the purpose of simplicity, the application will describe the floating solar systems in deployed in an ocean, although the reader will understand that other deployment locations are certainly possible.

Figure 1A:
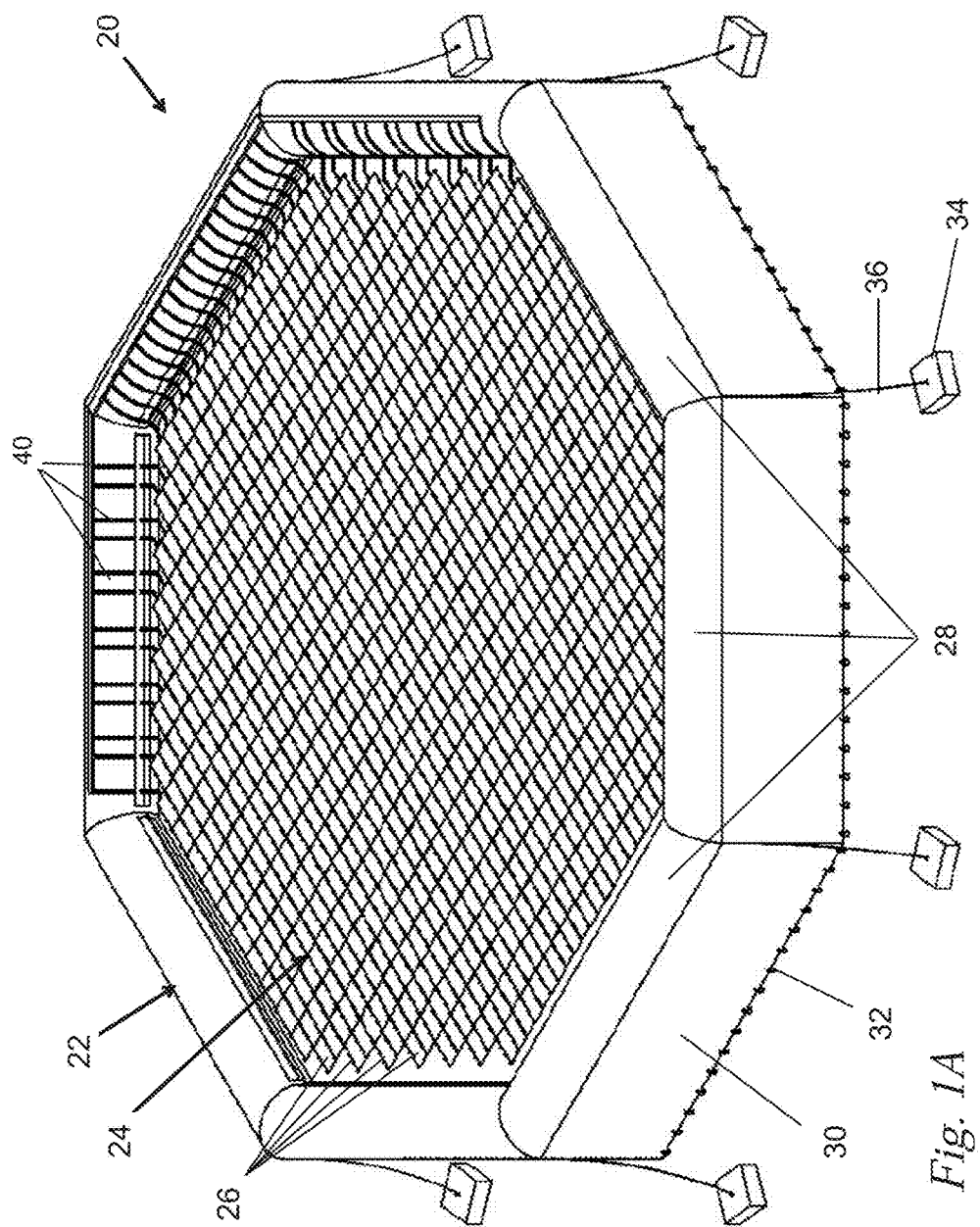

FIGS. 1A-1C illustrate an exemplary floating solar system 20 in accordance with the present application which includes a peripheral buoyant border pontoon 22 surrounding an array 24 of interconnected photovoltaic panels 26. The border pontoon 22 may be formed of one or more buoyant segments that together define a closed peripheral shape, and thus the term "border pontoon" refers to one or more buoyant elements. In the illustrated embodiment, there are 8 linear pontoon segments 28 that together define an octagon, though more or less segments, and non-linear segments may also be used. For instance, the pontoon 22 may be a complete circle formed of a single buoyant segment (such as an inflatable ring) or a single ring-shaped member with multiple internal airtight compartments (or segments).

FIGS. 1D-1F illustrate another floating solar system 20*a* comprising a border pontoon 22*a* defining a closed square peripheral shape. The array 24*a* of interconnected photovoltaic panels 26 is thus square. Like numbers will be used for like elements in the solar unit 20, 20*a* of FIGS. 1A-1C and 1D-1F. The reader will understand the number of possible configurations. A continuous peripheral shape formed of multiple linear segments such as shown is desirable for the sake of efficiency in fabrication of similar modules, and also for the structural conveniences afforded by the presence of numerous straight support edges for the photovoltaic panel array 24 (which for the sake of brevity will hereafter be termed the "solar array").

The floating solar system 20 shown features a continuous, regular rectilinear solar array 24 made up of rectangular photovoltaic panels 26 arranged in an orthogonal grid with outer edges conforming to the shape of the surrounding pontoon 22; in these cases an octagon or a square. In a preferred solution, the solar array may comprise several parallel arrays, each array being constituted of 2 parallel lines of photovoltaic panels. A preferred embodiment comprises the use of "dual glass" solar panels. This is also called bi-glass, wherein solar cells are tied between 2 layers of glass, as opposed to one layer of glass and one layer of plastic as for common panels.

As will be explained below, the outer edges of the solar array 24 are structurally connected to and supported by the inner sides of the pontoon 22 (or segments 28), and preferably structural elements such as cables span across the interior of the pontoon 22 and support the array 24 across the middle thereof. This provides additional buoyant forces to the array 24, but these additional forces are not strictly necessary for the buoyancy of the panels, as each panel is self-supported by its float. The local buoyant floatation device attached to the photovoltaic panels 26 drastically reduces the stress on the supporting structural elements. In this way, the photovoltaic panels 26 are desirably held on the top surface of the body of water by local and global buoyant forces so as directly receive incident sunlight while also distributing the weight of the array 24 in an even fashion.

FIGS. 1A-1F show a stabilizing skirt 30 depending vertically downward from the pontoons 22 and 22*a*. As will be explained below, a series of horizontal and vertical tubes preferably provide a framework for the skirt 30 and ensures that the submerged skirt remains substantially vertical in the water. The horizontal tubes can also be replaced by a row of weights 32 providing also a lower fringe for the skirt 30 and ensuring that the submerged skirt remains substantially vertical in the water. A plurality of anchors or fixed feet 34 connect to the periphery of the floating solar system 20, such as to the corners of the four-sided or eight-sided pontoon 22 with cables or lines 36. In one embodiment, the floating solar system 20 deploys in a relatively shallow body of water, such as near-shore in the ocean, so that the lines 36 need not be unduly long. For instance, the feet 34 and lines 36 may be safely used to a depth of 10-20 meters. Other anchoring systems like dead weights or suction piles may also be utilized. Indeed, the feet 34 and lines 36 may represent a system of weights for holding the skirt 30 vertical. The skirt can also be held vertical thanks to vertical and/or horizontal tubes inserted in the skirt. Of course, a more robust system of anchorage may be used to greater depths as will be described.

The solar array 24 also includes a plurality of electrical cables 40 interconnecting the photovoltaic panels 26. In a preferred embodiment, the cables 40 attach generally to one side of the solar array 24, such as at the terminal end of the columns of photovoltaic panels 26 in the array. In the illustrated embodiment, and is best seen in the top plan view of FIG. 1B, the solar array 24 with a plurality of rows 42 and columns 44 and an overall octagonal shape. Electrical cables 40 are shown connected to the terminal and each of the columns 44 along three sides of the octagon, corresponding to three straight segments 28*a*, 28*b* and 28*c* of the eight-sided pontoon 22. In this manner, a complete circuit is formed through all of the photovoltaic panels 26 in each of the columns 44. Parallel connecting cables 46 are then used to combine the power generated by the panel columns 44, which can then be routed to a power converter, as will be described. Electrical cables 40, 46 desirably run alongside structural cables so as not to bear any significant weight.

Figure 2A:
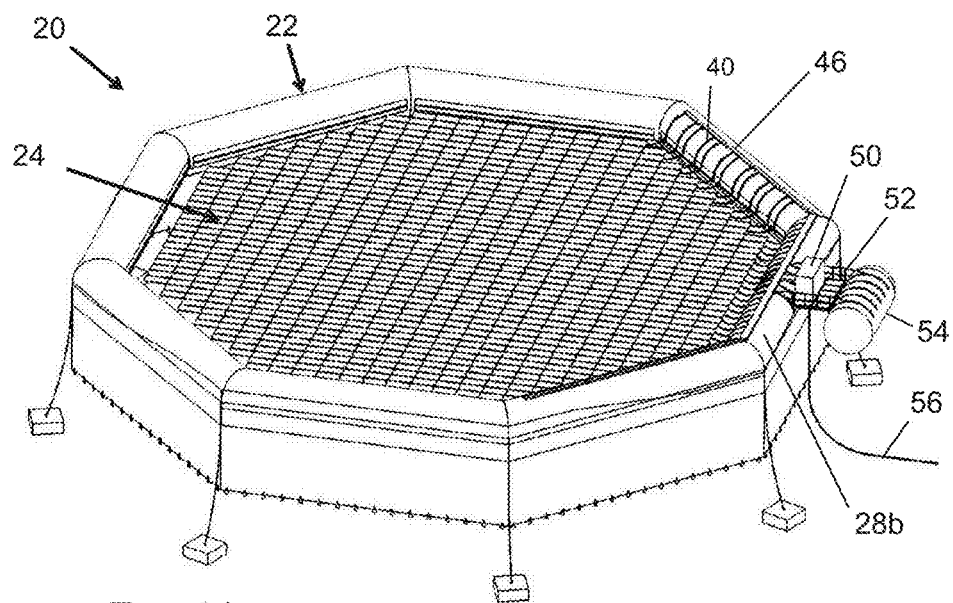
FIGS. 2A and 2B are perspective views of an exemplary floating solar system shown in two different system hookups.
Figure 2B:
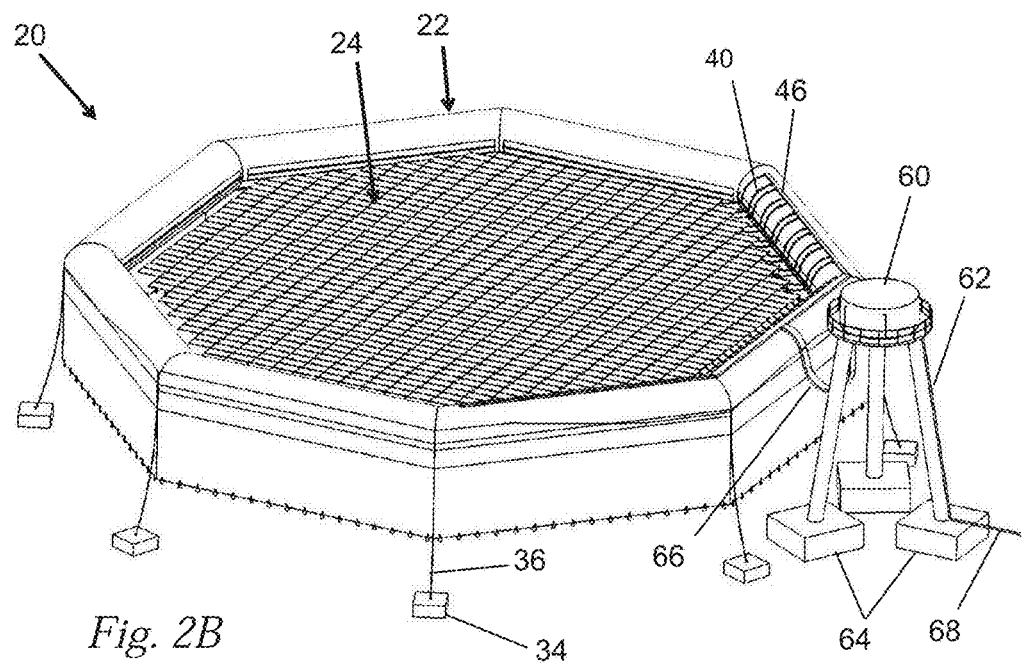

FIGS. 2A and 2B are perspective views of the exemplary floating solar system 20 shown in two different system hookups. As mentioned, the interconnected electrical cables 40, 46 are eventually combined and routed to a power converter. The power converter typically processes direct current (DC) power into an alternating current (AC) for transmission to a remote location for consumption. FIG. 2A illustrates a mobile power converter 50 attached directly to one side of the pontoon 22, most preferably to the middle segment 28*b* of the pontoon on which the electrical cables 40, 46 are mounted. In the illustrated embodiment, the power converter 50 is supported on a platform 52 which, in turn, is supported by a large float or buoy 54. In this way, the converter 50 may be towed along with the rest of the floating solar system 20 to its collection location, and in general moves with the solar unit. However, as mentioned above the floating solar system 20 years desirably anchored on the sea bottom using, for example, chains and anchors. An electrical transmission cable 56 is shown leading away from the converter 50 toward a remote storage or consumption location.

In contrast, FIG. 2B a more robust autonomous converter 60 can be fixed on the sea bottom via elongated legs 62 and feet 64. The floating solar system 20 is then structurally coupled to the free-standing converter 60 via a cable 66 or other such securement. Although not shown, separate cables connect the electrical cables 40, 46 of the solar array 24 to the converter 60, and an electrical transmission cable 68 is again shown leading away from the converter 60 toward a remote storage or consumption location. The floating solar system 20 is shown with its own anchorage; namely the feet 34 and cables 36. However, the free-standing converter 60 may be used to anchor one or more free-floating solar systems 20 in moderate water depths, such as around 30 meters. As will be described below, a plurality of the free-floating solar systems 20 may be lashed together and then anchored to the sea bottom using one or more of the free-standing convertors 60, or other such deep water anchors. Indeed, the floating solar systems 20 described herein may be deployed in considerably deeper water, such as with oil platforms, either anchored rigidly on the sea bottom or through cables and chains.

Figure 3A:
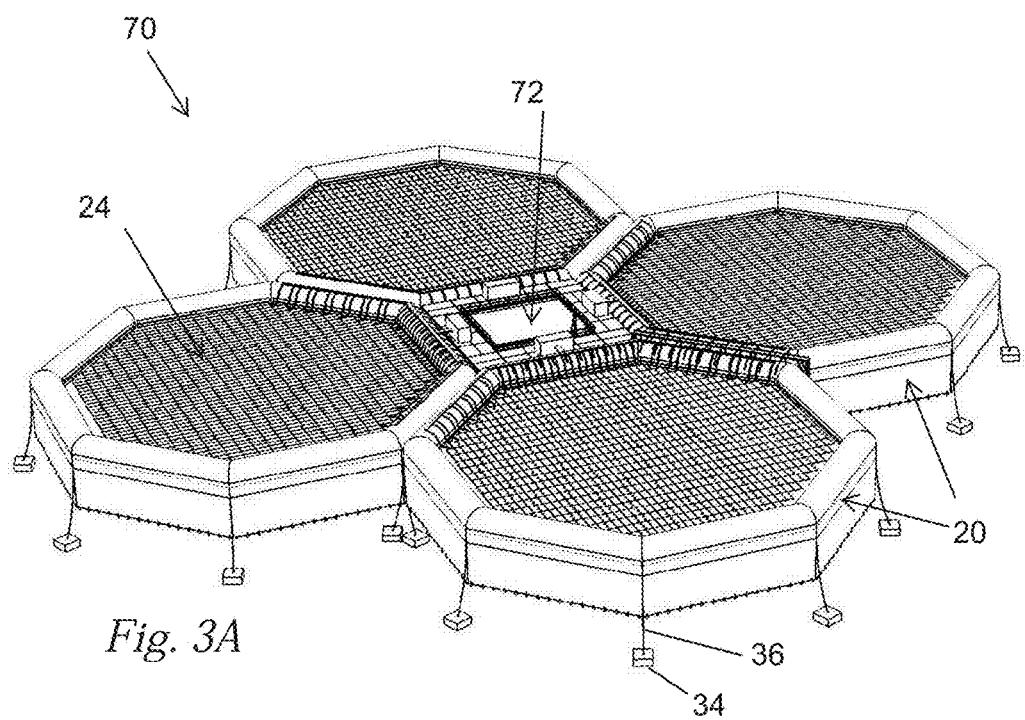
FIGS. 3A and 3B are top and bottom perspective views of multiple floating solar systems aggregated into a cluster.
Figure 3B:
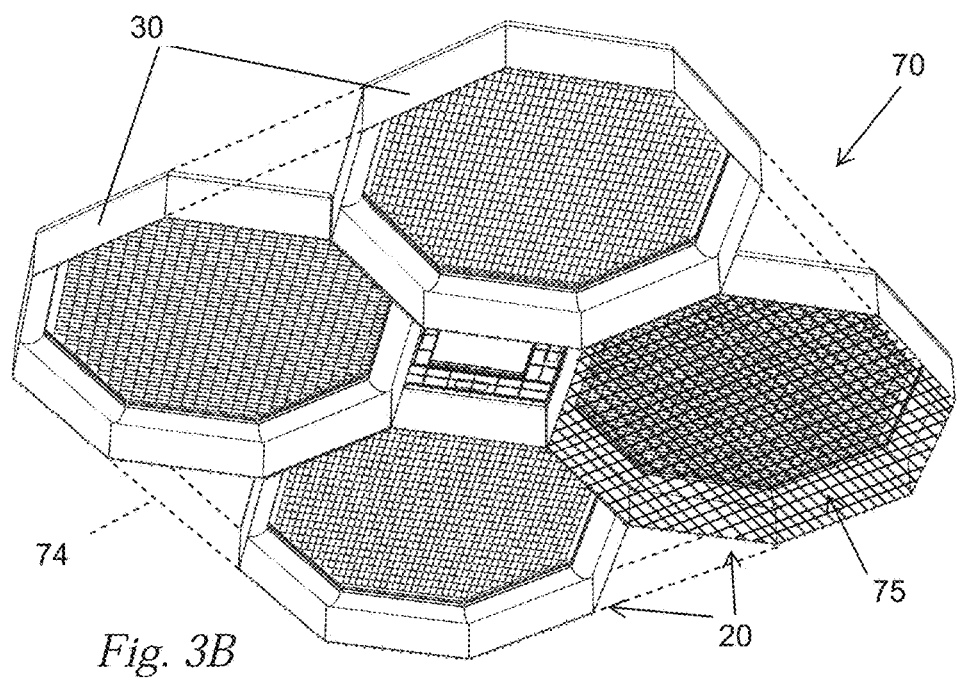
Figure 3C:
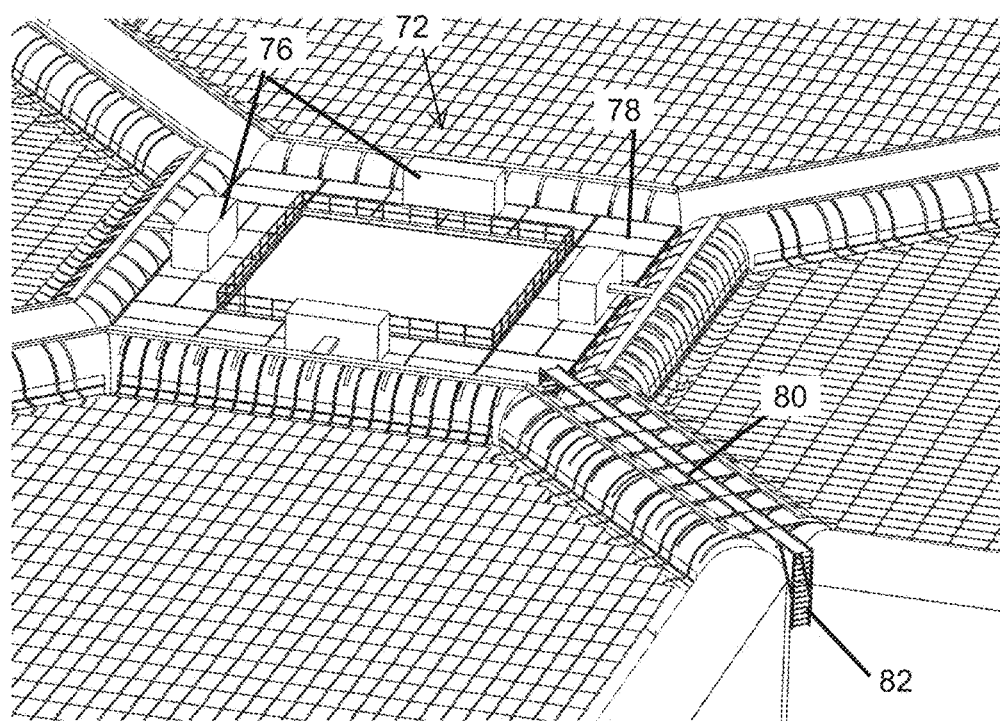
FIG. 3C is a closeup of a central converter area.

FIGS. 3A and 3B illustrate from above and below an island 70 made up of multiple floating solar units or systems 20 aggregated into clusters. A "floating solar system" as defined herein comprises one of the floating solar units or systems 20 shown in FIGS. 1-2, while a "cluster or "island" of such individual units includes at least two connected together in aggregate. In the illustrated embodiment, the floating solar systems 20 have an octagonal configuration such that two each of their straight sides can be abutted against straight sides of adjacent units, with a square central converter area 72 formed therebetween. FIG. 3C is a closeup of the central converter area 72. The central converter area 72 may be part of the overall floating island 70 anchored by the feet 34 and cables 36 of each of the units 20, or the central converter area 72 may represent a free-standing anchorage, such as the converter 60 of FIG. 2B.

In the case of non-inclined photovoltaic panels 26 used mainly between the Tropics, with an optimal efficiency on the equator line, the solar units 20 could also move (rotate) around a unique anchoring point, as no optimal position of the photovoltaic panel is required. The non-anchored floating solar systems 20 are attached to the other units with (for example) a system of ropes, making the system globally anchored.

The skirts 30 may be provided around each of the floating solar systems 20, or a global skirt can be used around the assembly of units, such as shown in phantom at 74 in FIG. 3B. In the latter case, the combination of several floats lead to an increase of dimension of the column(s) of water for the moon pool effect, and thus to a change in the resonance period of this column. A specific calculation of the resonance period must thus be specifically calculated, as will be more fully understood below.

FIG. 3B also shows a protective grid, mesh or net 75 covering the underside of one of the solar units; in particular spanning across underneath the stabilizing skirt 30. The net 75 stops fish and marine animals from damaging the solar panels and the electrical cables and connections. In addition, the net 75 acts as a damping device in the moon pool system. The nets 75 are desirably easily dismantled for maintenance purpose, such as by securing them around their edges with large scale Velcro or the like.

FIG. 3C illustrates the central converter area 72 preferably includes a converter 76 allocated to each of the floating solar systems 20 mounted on a common gangway 78. As mentioned above, the central converter area 72 may have flotation means, or maybe anchored to the sea bottom. To facilitate maintenance, an access pathway 80 is shown extending between adjacent straight sides of two of the units 20 leading to access ladders 82, the inner one of which is not visible. In this manner, technical personnel can easily access the central converter area 72 in the case of malfunction or routine maintenance.

Figure 4:
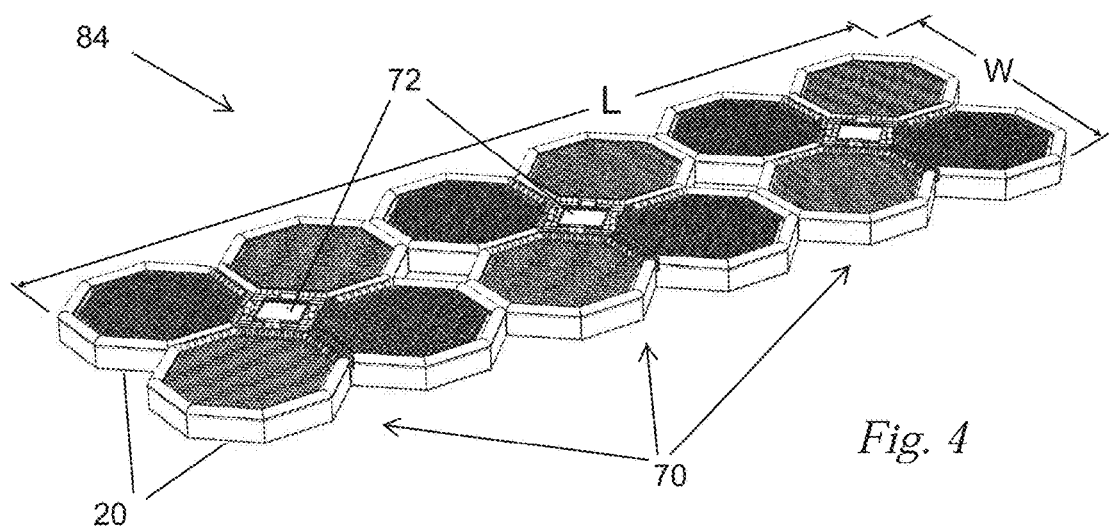
FIG. 4 is a perspective view of a larger cluster of connected floating solar systems.

FIG. 4 is a perspective view of a larger cluster 84 of connected floating solar islands 70, such as that shown in FIGS. 3A-3B. In the configuration shown, three of the solar islands 70 are attached to one another in a linear fashion so as to form an elongated cluster having a length L and a width W. The overall length L and width W depends on the dimensions of the individual floating solar systems 20. If, for example, the solar units 20 have a diameter (approximate across diametrically opposed straight sides) of between 40-80 m, the overall length L would be between 240-480 m, and the width W would be between 80-160 m. Of course, different shapes and arrangements of the individual solar units 20 are contemplated, the elongated cluster 84 shown in Figure for being exemplary only. It should be noted, however, that forming clusters of no more than two solar units wide enables rapid access to the central converter areas 72 of each modular island 70. Furthermore, as mentioned above, each individual solar unit 20 may be anchored to the sea bottom, or a series of power-like anchors may be utilized either underneath the central converter areas 72 or to the outside of the cluster 84.

FIGS. 5-8 illustrate particular structural elements and alternatives therefore for the peripheral pontoons 22. The overall function of the pontoons 22 is to provide buoyancy around the outside of the solar arrays 24, and also provide support for anchor connections, platforms and electrical connections.

Figure 5A:
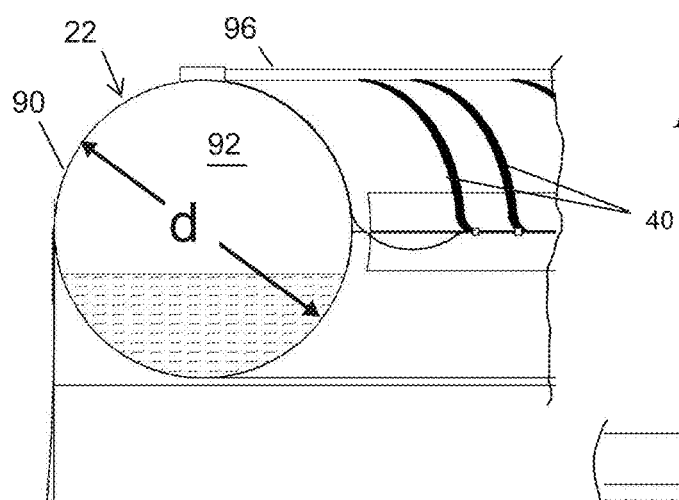
FIGS. 5A-5C are sectional and partial views of an exemplary border pontoon and electric cable networks for the floating solar systems.
Figure 5B:
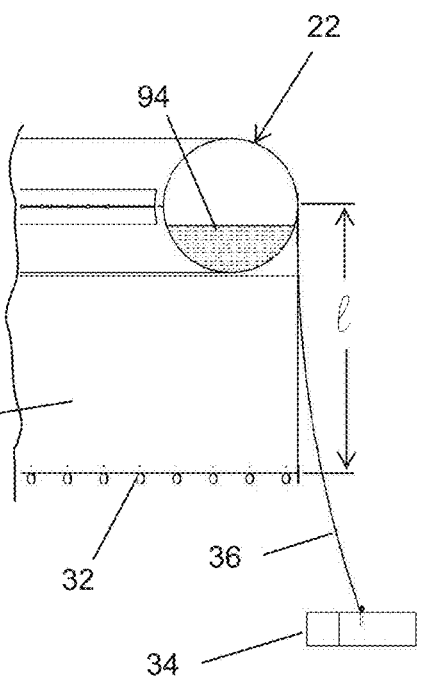
Figure 5C:
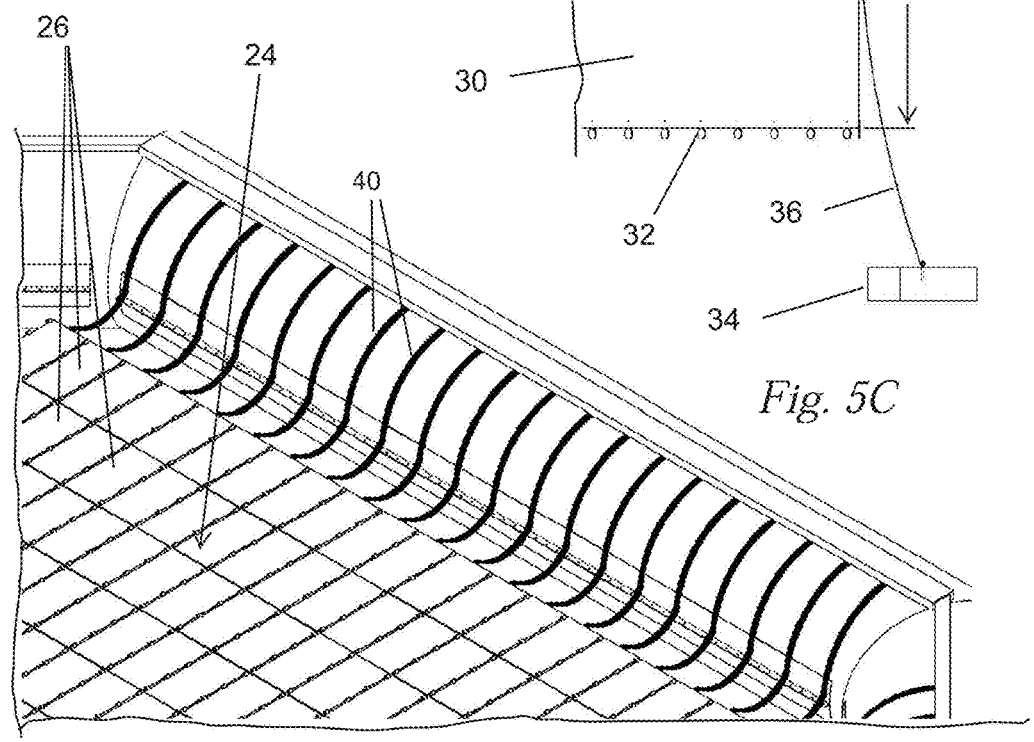

FIGS. 5A and 5B are sectional views of an exemplary pontoon 22 comprising a tubular hollow buoy 90. The surrounding stabilizing skirt 30 having the weighted fringe 32 is shown hanging down from an outer generatrix of the buoy 90. An anchoring foot 34 connects via the cable 36 to the stabilizing skirt 30.

An internal chamber 92 of the buoy 90 may be partially filled with water 94 as ballast for increased stability. Although the buoy 90 is shown as an enclosed tubular hollow member, it may also be formed of a buoyant solid, such as Styrofoam, or have a configuration more like the hull of a barge, for example. In a preferred embodiment, the hollow buoy 90 comprises a reinforced fabric impregnated with water resistant material such as rubber, much like a modern Zodiac-style boats. An internal diameter d of a buoy section is desirably between 1 to 4 meters. Furthermore, the length l of the skirt 30 is preferably between 3 to 15 meters.

The electric cables 40 that transmit power from the solar array 24 are shown extending upward from the array to an upper frame member 96 fastened to the top of the pontoon 22. Although shown schematically previously, the parallel electric cables 46 that combine the power of the individual photovoltaic panels 26 are desirably routed through the enclosed frame member 96 to protect them from the elements.

Figure 6:
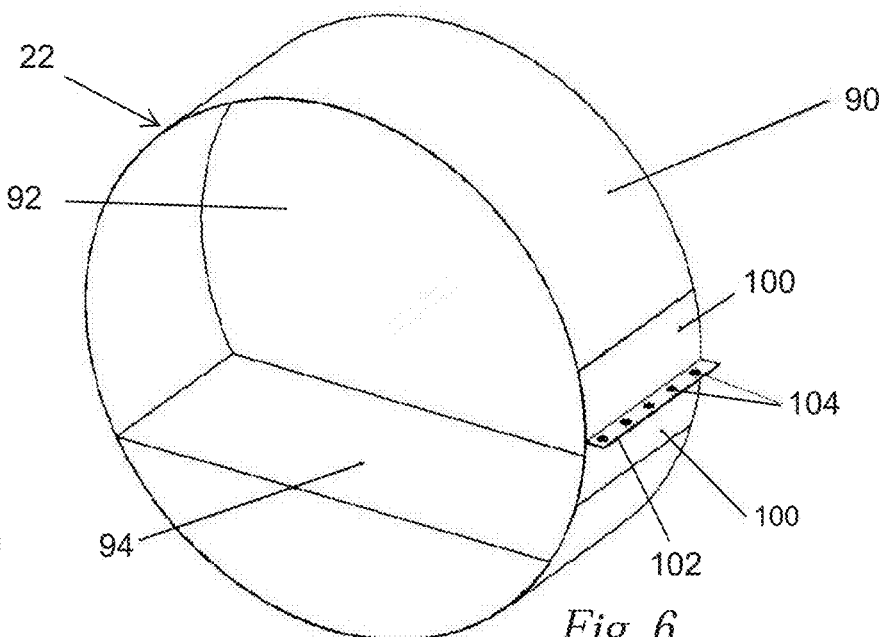
FIG. 6 is a radial section through an exemplary border pontoon.

FIG. 6 is a radial section through an exemplary pontoon 22 (or segment thereof) in the form of the tubular hollow buoy 90 with the internal chamber 92 partially filled with water 94. An inner side (to the right) of the buoy 90 has upper and lower reinforced panels 100, preferably made of fabric either sewn or glued thereto. The reinforced panels 100 secure a structural flange 102 having a T-shaped cross-section and a plurality of grommets 104 in an orientation extending inward from the pontoon 22. The grommets 104 provide fastening locations for a plurality of flexible structural elements, typically cables, that span the interior space surrounded by the pontoon 22 and support the solar array 24, as will be explained.

Figure 7A:
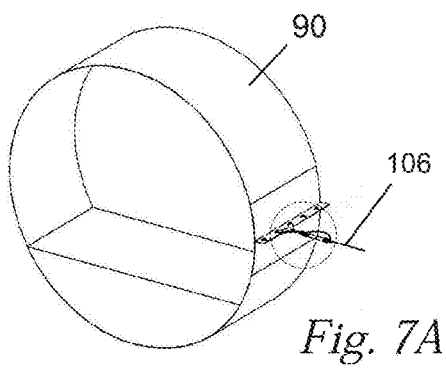
FIGS. 7A and 7B are perspective views of an inner side of a border pontoon showing an attachment configuration for support cables used to suspend photovoltaic panels within a floating solar system.
Figure 7B:
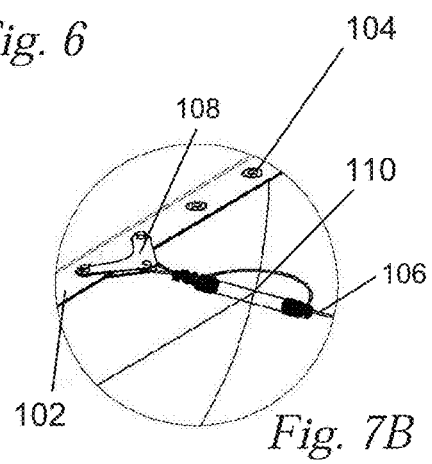

FIGS. 7A and 7B are perspective views of the inner side of the pontoon 22 showing a support cable 106 attached to the grommets 104 on the flange 102. As will be more clearly shown below a plurality of the support cables 106 are used to suspend photovoltaic panels within the floating solar systems 20. The illustrated fastening configuration comprises a V-shaped bracket 108 having two free ends that are secured to two adjacent grommets 104 via fasteners such as rivets, and an apex including a through hole to which the cable 110 attaches. In one embodiment, the cable 106 may be looped through the through hole and then pulled taut and secured by a cinch assembly 110, or the like.

Figure 8A:
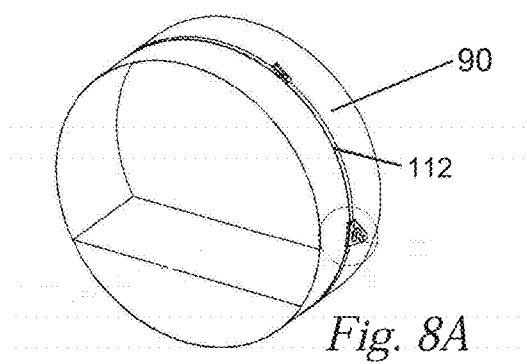
FIGS. 8A and 8B are perspective views of an inner side of a border pontoon showing an alternative attachment configuration for the photovoltaic panel support cables.
Figure 8B:
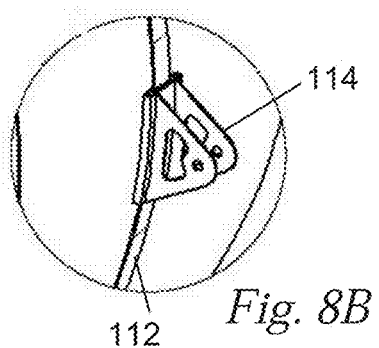

FIGS. 8A and 8B illustrate an alternative attachment configuration for the photovoltaic panel support cables 106. In particular, a strap 112 circumscribes the hollow buoy 90 and secures a bifurcated triangular-shaped bracket 114 in an orientation facing inward from the pontoon 22. Although not shown, a fastener may be secured between the flanges of the bracket 114 to provide an anchor around which the support cable 106 may be looped, and secured as mentioned above. Of course, there are numerous other configurations for securing the support cables 106 to the pontoon 22, the illustrated embodiments being exemplary only.

Figure 9:
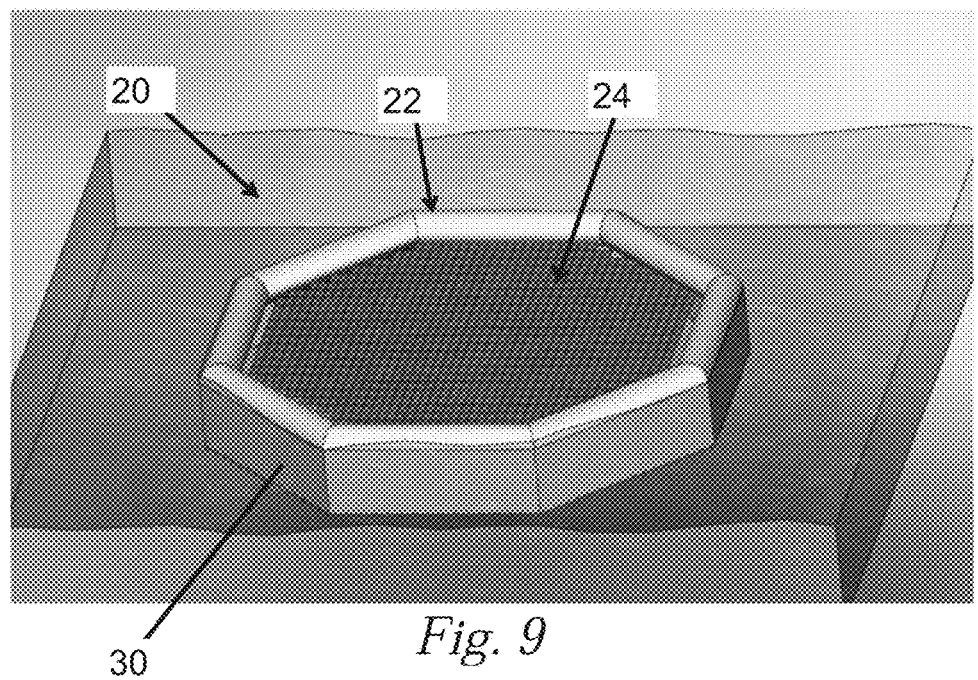
FIG. 9 shows a floating solar system in water illustrating a submerged stabilizing skirt.

FIG. 9 shows a floating solar system 20 in water and the weighted stabilizing skirt 30 hanging down therefrom. The peripheral pontoon 22 surrounds the solar array 24 which floats on the surface of the water within the pontoon. Because the stabilizing skirt 30 extends downward, a column of water is defined below the solar array 24 that is partially isolated from the surrounding wave action. More particularly, the stabilizing skirt 30 creates a "moon pool" effect for the floating solar systems 20.

Figure 10:
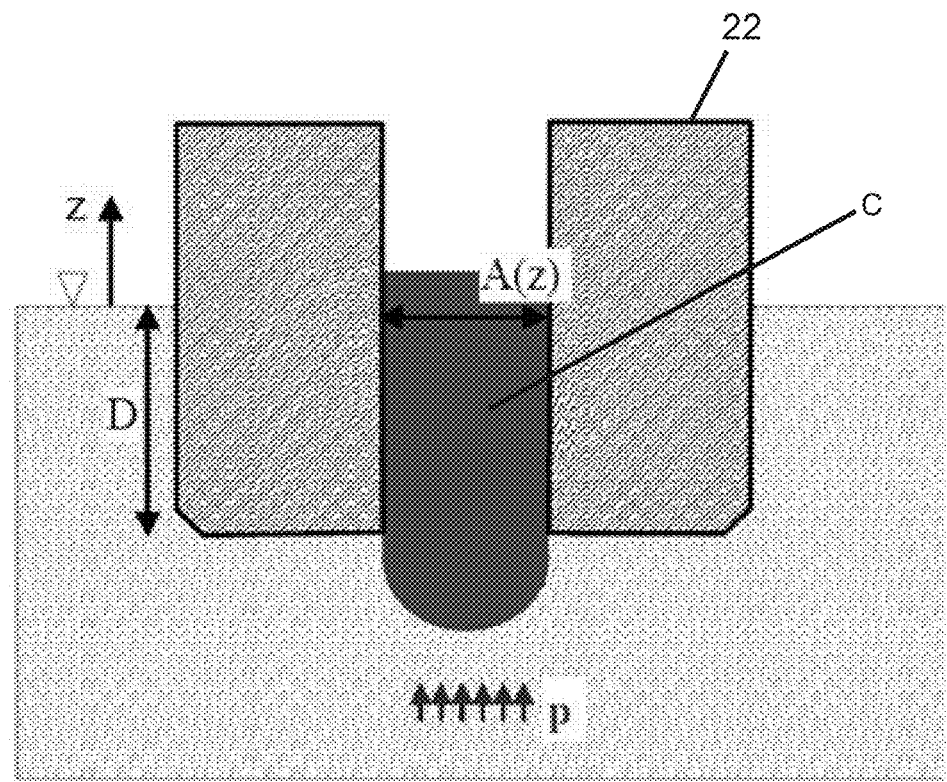
FIG. 10 is a diagram showing the geometry used to define a water column within the floating solar systems.

FIG. 10 is a diagram showing the geometry used to define the water column C within the floating solar system 20. The water column C inside the pontoon 22 acts like a column of water independent from the seawater outside the pontoon. The resonance period (natural frequency of up-and-down movement) of this column of seawater is determined by its geometry, and therefore by the geometry of the pontoon 22 (which creates the column of water). The resonance period of the seawater column (in dark blue in the above sketch) is a function of the length or depth D of the float and the horizontal area A(z) of a section of the column which can vary with the depth z, according to the shape of the surrounding structure. In the exemplary configuration, the shape is defined by the pontoon 22 and the skirt 30. The column section A(z) is thus not exactly constant. However, with the dimensions assumed above, it can be considered as a first approximation that the diameter of the seawater column is quasi constant. Under this approximation, the resonance period is roughly:

$$T_0 = \frac{2\pi}{\sqrt{g}} \sqrt{D + \kappa \sqrt{A}}$$

In this formula (also known as Fukuda formula), K is an empirical constant between 0.4 and 0.5. This resonance period can be influenced by damping devices installed in the water column, like the protection net inside the skirt in our case.

Figure 11:
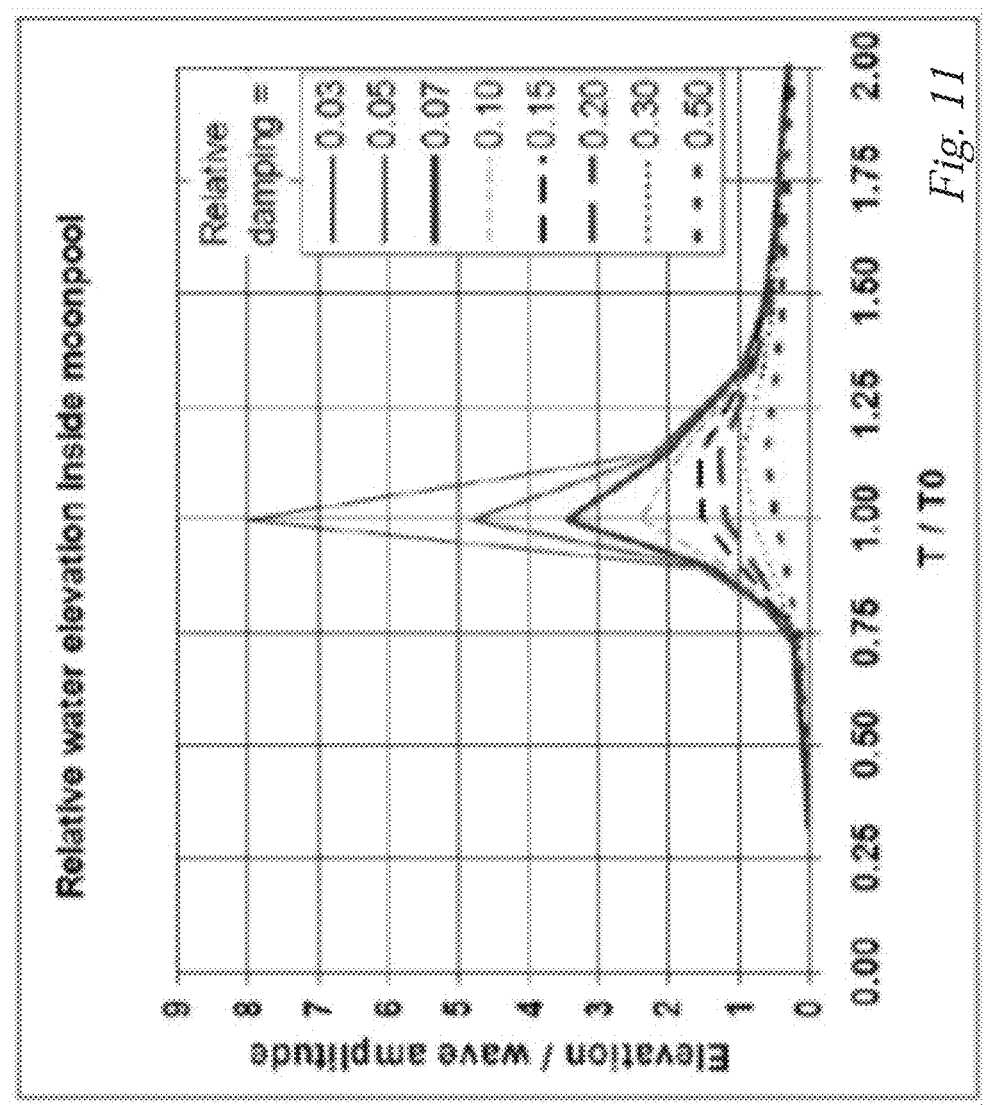
FIG. 11 is a graph showing the relative water elevation inside the moon pool as it varies with wave frequency.

The relative water elevation inside the moon pool, also called Response Amplitude Operators of the moon pool, varies thus with wave frequency (noted as T), and for different damping levels as seen in FIG. 11.

It is thus seen that the floating solar system 20 composed of the pontoon 22 and skirt 30 (and also potentially of the net 75 seen in FIG. 3B used as a damping device) acts as a wave breaker of the outside waves, drastically reducing their period and their amplitude inside the unit, and thus allowing the photovoltaic panels 26 to float on a flat sea surface with a very reduced level of wave movement. The floating solar system 20 must be designed to avoid a situation where the resonance period of the seawater column $T_0$ coincides with the typical period of the sea around the float, called T. When T is close to $T_0$, the waves in the moon pool can become even bigger than the waves outside. The dimensions and the geometry of the floating solar system 20 (pontoon, skirt and net) must therefore be carefully calculated to avoid operation with a seawater period close to the surrounding resonance period. In one embodiment, the skirt 30 has a depth that is between about 10-40% of the width of the closed peripheral shape of the floating solar system 20, and more preferably between about 15-30% of the width.

Figure 12A:
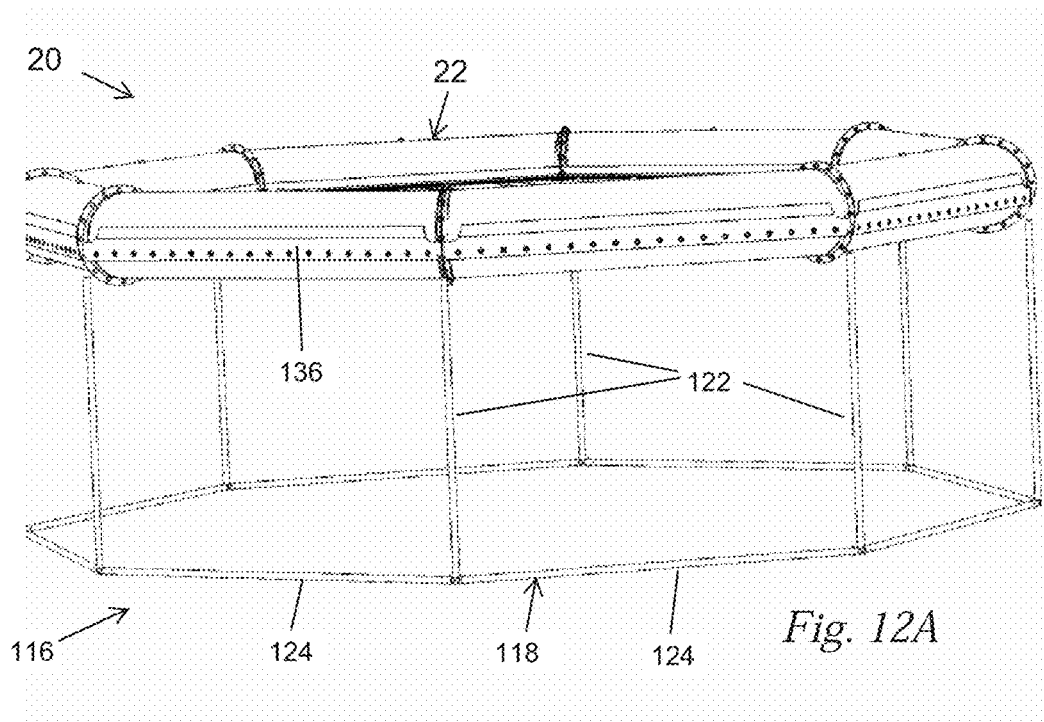
FIG. 12A-12O are various perspective and closeup views of an exemplary stabilizing skirt formed of a frame of tubular members and vertical panels.
Figure 12B:
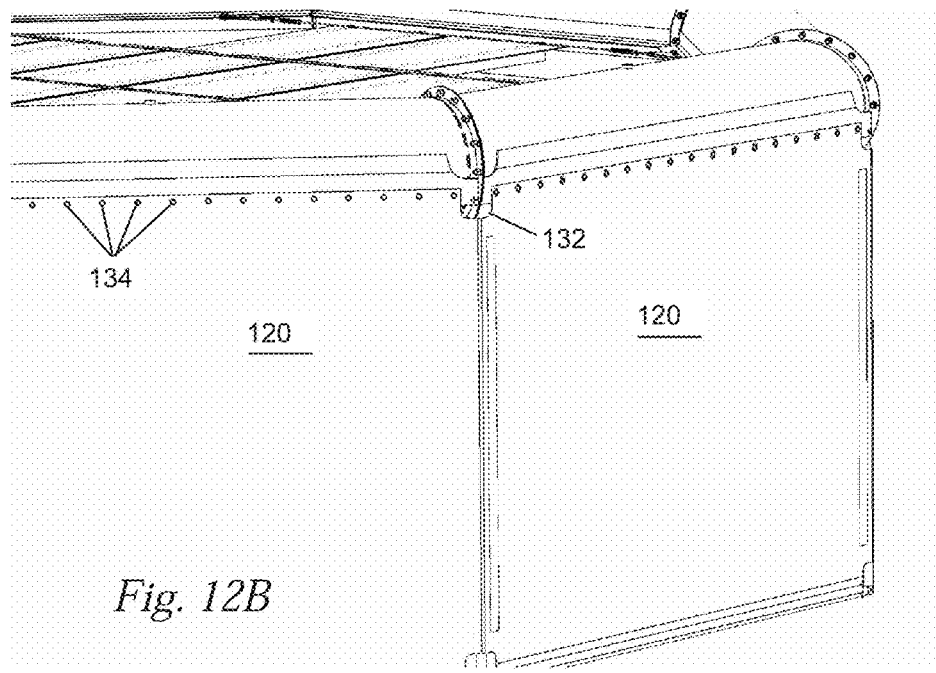
Figure 12M:
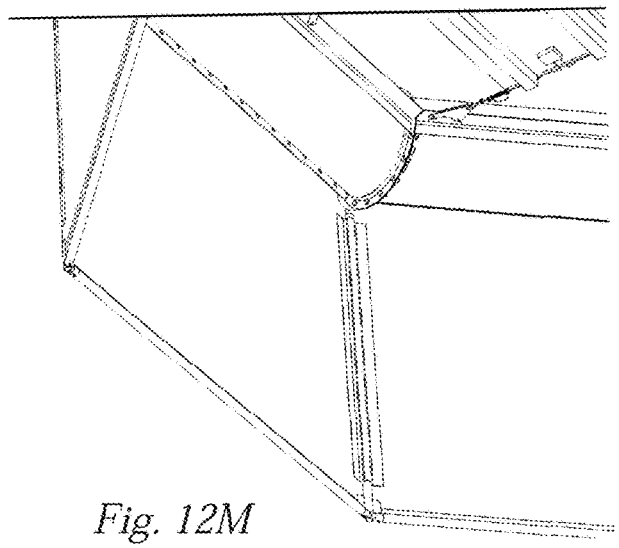
Figure 12O:
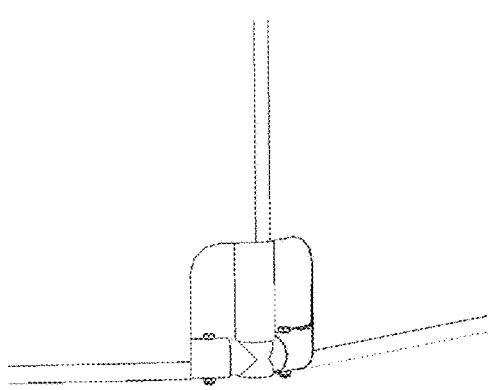

FIG. 12A-12O are various perspective and closeup views of an exemplary stabilizing skirt 116 formed of a frame 118 formed of struts and vertical panels 120. As explained above, the skirt is relatively rigid and depends down into the water from the border pontoon 22 so as to provide a "moon pool" effect and reduce wave motions inside the floating solar system 20. The skirt 116 is weighted to remain substantially vertical in the water and form a barrier around the column C of water.

FIG. 12A shows the frame 118 comprising a series of vertically-oriented struts 122 attached to the underside of the border pontoon 22 and interconnected with a series of lower horizontal fringe struts 124. In a preferred embodiment, the struts 122, 124 are preferably tubular members, which terms will be used interchangeably hereinafter. FIG. 12B illustrates the vertical panels 120 attached to the frame 118 and also to the border pontoon 22. Preferably, the struts 122, 124 are tubes made of inox or stainless steel, but they could as well be made of any other material resisting to the seawater and with a higher density than the seawater. The vertical panels 120 may also be formed of stainless steel, though they could also be formed of a durable polymer or even fabric that is relatively flexible so that the skirt flexes with wave motion.

FIGS. 12C and 12D show the stabilizing skirt 116 including the frame 118 and vertical panels 120 separated from the border pontoon 22. In the illustrated embodiment, the border pontoon 22 has an octagonal shape, though as mentioned, other shapes are contemplated. In the octagonal form, the frame 118 defines eight vertical sides for the stabilizing skirt 116 and there are eight vertical panels 120. More particularly, the frame 118 includes eight vertices each of which has one of the vertically-oriented struts 122 and a lower horizontal fringe strut 124 connecting the lower ends of each pair of adjacent vertical struts. Eight vertical panels 120 cover the vertical areas within the border created by adjacent vertically-oriented struts 122 and the associated horizontal fringe strut 124. The vertical edges of each panel 120 are fastened either to the adjacent vertically-oriented strut 122 or to the vertical edges of the adjacent panel 120. The result is a substantially solid vertical wall for the stabilizing skirt 116 that creates the calm "moon pool" effect under the border pontoon 22.

Figure 12N:
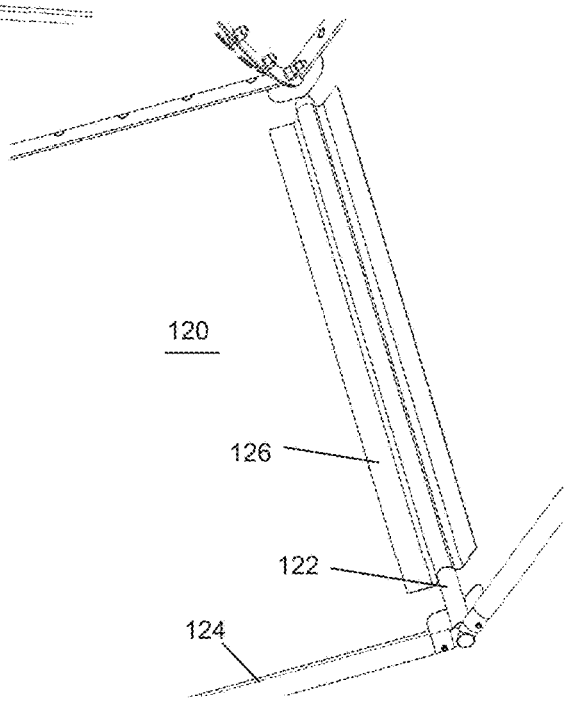

With reference to FIG. 12E and detail of FIG. 12F, a horizontal section through one of the vertices of the stabilizing skirt 116 shows the vertically-oriented strut 122 with adjacent vertical panels 120 secured thereto on the outer side thereof. One or more straps or a thin panel 126 (see FIG. 12N) of flexible material may be secured to the inner faces of each adjacent panel 120 so as to create a pocket for the strut 122. FIG. 12G shows a detail of a lower end of a vertex wherein a three-way connector 128 may be used to join the vertically-oriented strut 122 and adjacent horizontal fringe struts 124. In an exemplary embodiment, the struts 122, 124 are tubular and the three-way connector 128 comprises a three-pronged male member that inserts into the throughbore of each tube and secures thereto with an interference fit, or more securely with a bayonet lock or the spring-loaded pins 130 shown. Adjacent panels 120 are desirably formed with small cutouts 132 at their lower corners to enable assembly of the frame struts. FIGS. 12H-12J further illustrate this assembly at the lower vertices of the frame 116. The three-way connector 128 provides a flexible connection between the horizontal and vertical tubes so as to allow the skirt to deform with the sea currents.

With reference again to FIGS. 12A and 12B, an exemplary construction includes a series of throughholes 134 located along the top edges of each vertical panel 120 that may be secured to a frame member 136 attached to the border pontoon 22. That is, the frame members 136 are shown in FIG. 12A and may be secured at either end to a vertex of the octagonal pontoon 22 or along the outside of the pontoon such as with flanges as described above at 102 or 114 in FIGS. 6-8. In this way, the upper edge of the stabilizing skirt 116 connects around the pontoon 22. The upper corners of each panel 120 also has a cutout 132 to facilitate assembly.

Figure 13A:
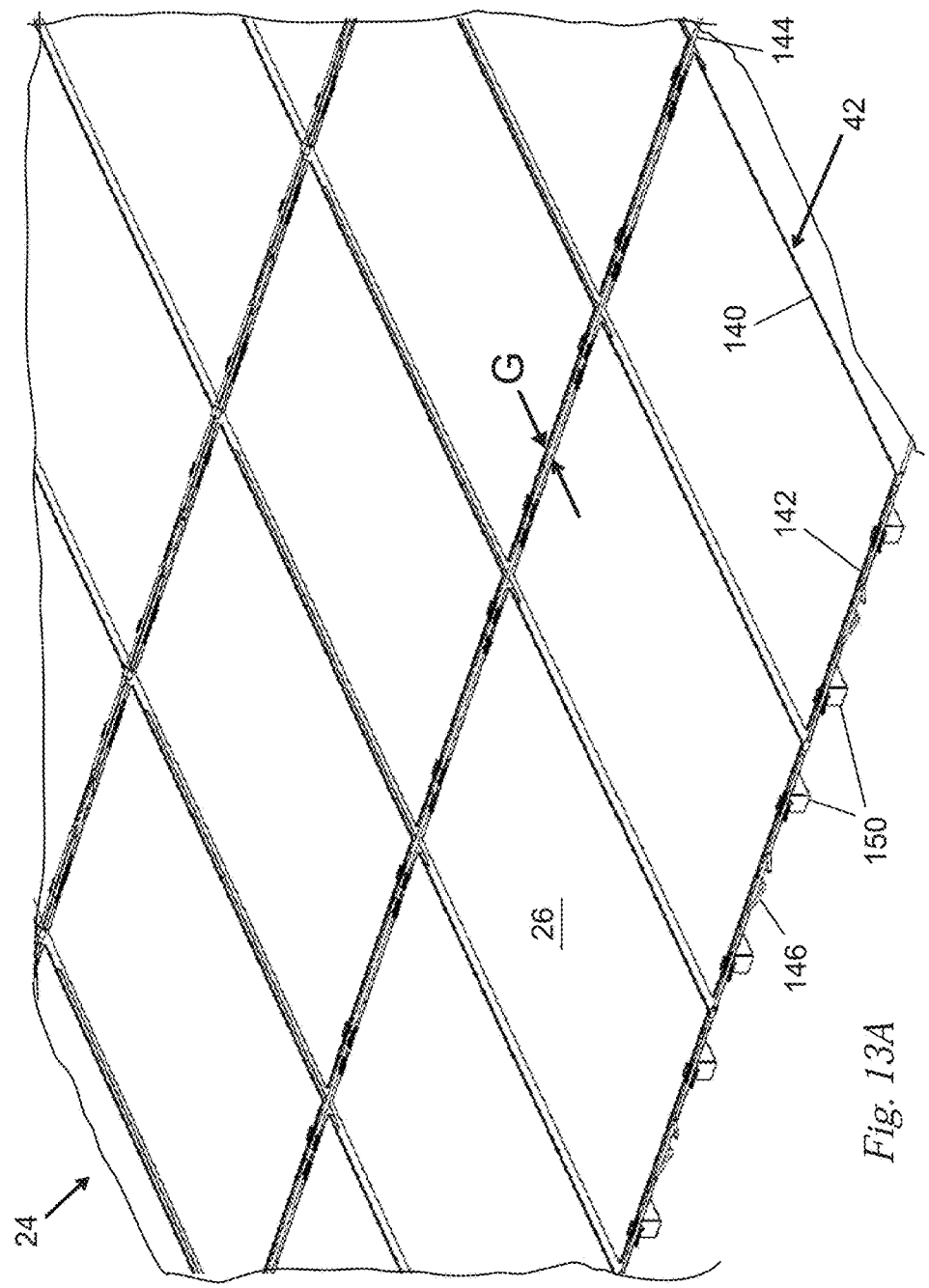
FIG. 13A-13N are various perspective and closeup views of exemplary photovoltaic panels and their interconnection within the floating solar systems.

FIG. 13A-13N illustrate details of exemplary photovoltaic panels 26 and their interconnection within the floating solar systems 20. As mentioned above, the panels 26 are preferably thin, rectangular and arranged in a polygonal grid; that is, identical panels aligned in rows and/or columns. The panels 26 may be provided in a variety of sizes, but typically have a length dimension along a long edge 140 approximately twice the width dimension along a short edge 142. As seen in FIG. 13A, the panels 26 are regularly arranged with constant gaps G between adjacent length and width edges 140, 142. Preferably, the grid can be arranged by groups of two lines of panels. The gap G is sufficient to provide space for elements such as structural cables 144 that span across the outer pontoon 22 and help support the array 24 of panels 26 in the "moon pool" of the floating solar system 20. In the illustrated embodiment, the cables 144 extend in parallel rows in the gaps G between the short edges 142 or rows 42 of panels 26. Electrical cables 146 also extend in these gaps between the rows 42. In one embodiment, the gap G is between 10-30 mm. In addition, rigid or flexible bracketing or other such connectors (not shown) may be included between the edges of the panels 26 to maintain their regular spacing. Each photovoltaic panel 26 has at least one flotation device 150 secured thereto so that the array of photovoltaic panels float on the surface of water.

Figure 13B:
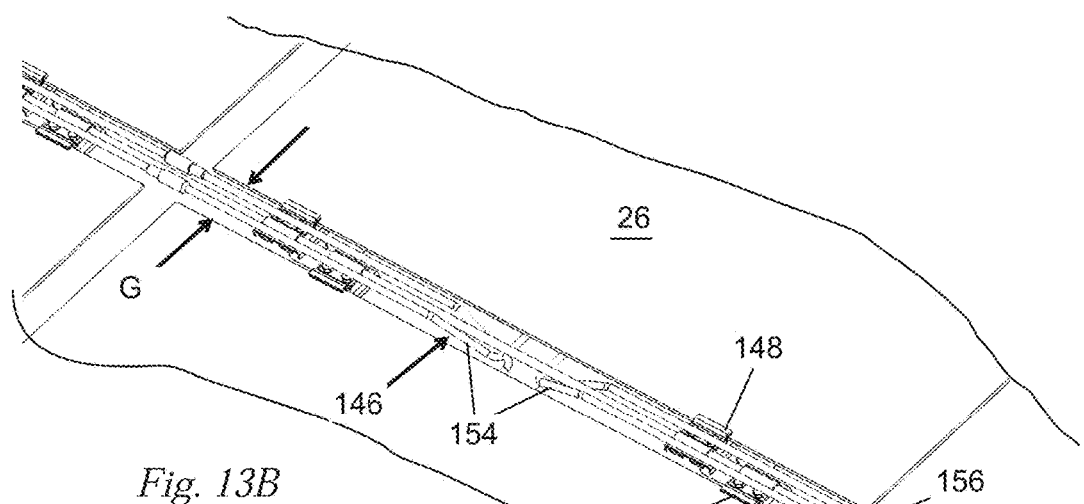
Figure 13C:
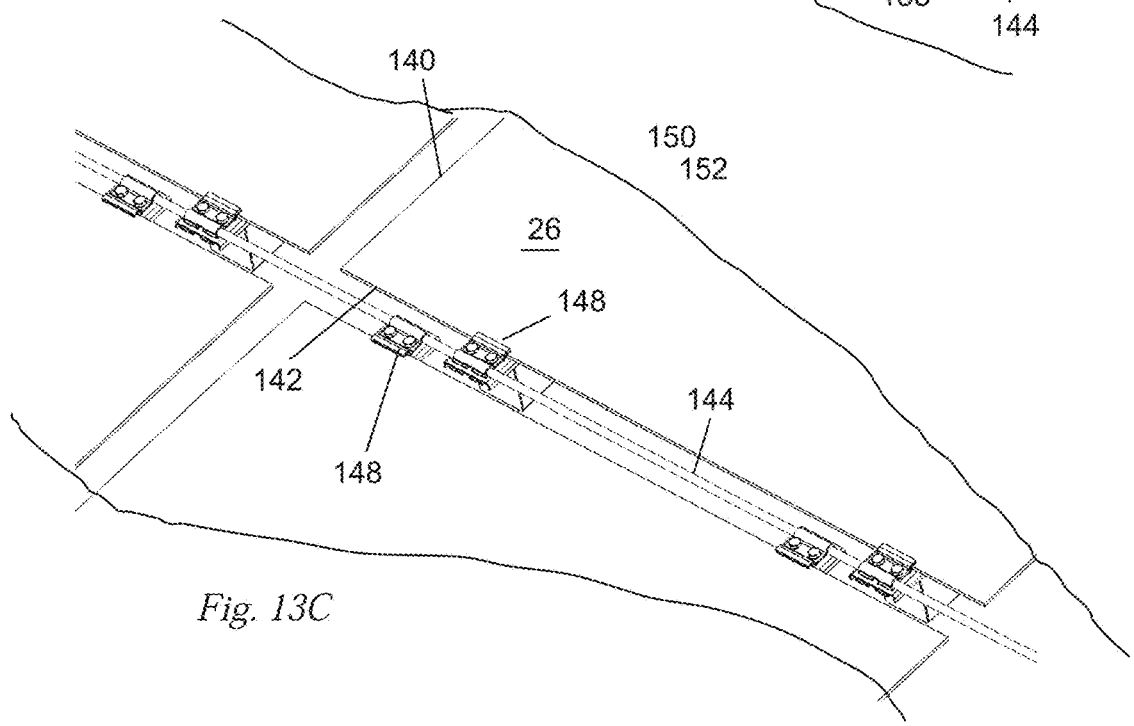
Figure 13D:
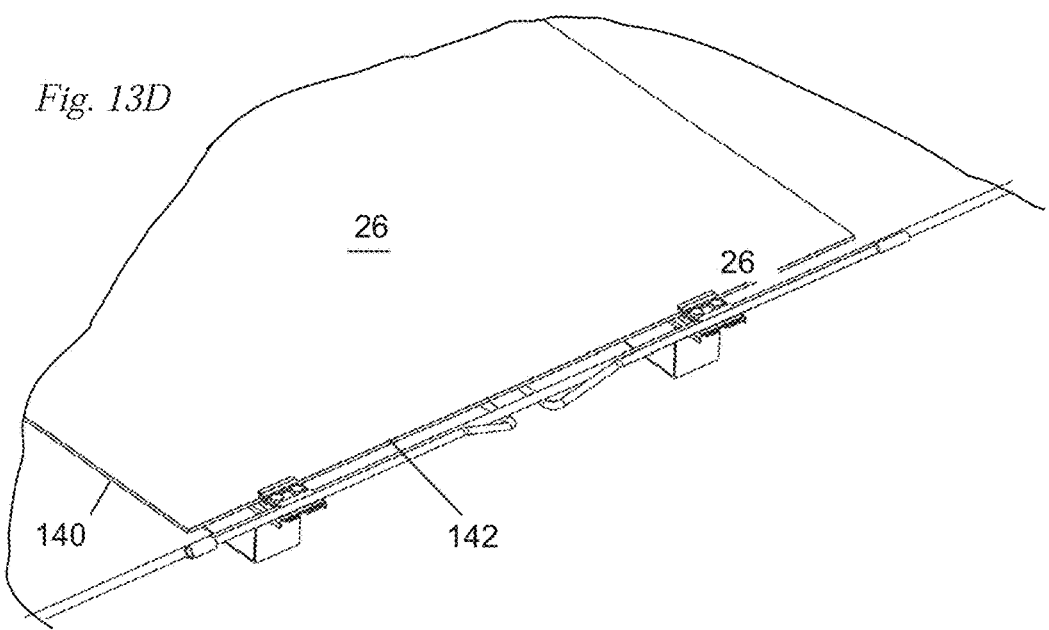

With reference now to FIGS. 13B-13H, structural and electrical connections between the panels 26 are shown in greater detail. FIG. 13B illustrates the gap G between the short edges 142 of two adjacent panels 26 along with both the structural support cable 144 and electrical cables 146 extend, while FIG. 13C illustrates the gap G between the short edges 142 of two adjacent panels 26 along which only the structural support cable 144 extends. Preferably, the electrical cables 146 extend in every other gap G between rows 42 of panels 26. Fastener brackets 148 secured to the short edges 142 extend into the gaps G between the panels to hold the cables 144, 146.

Figure 13E:
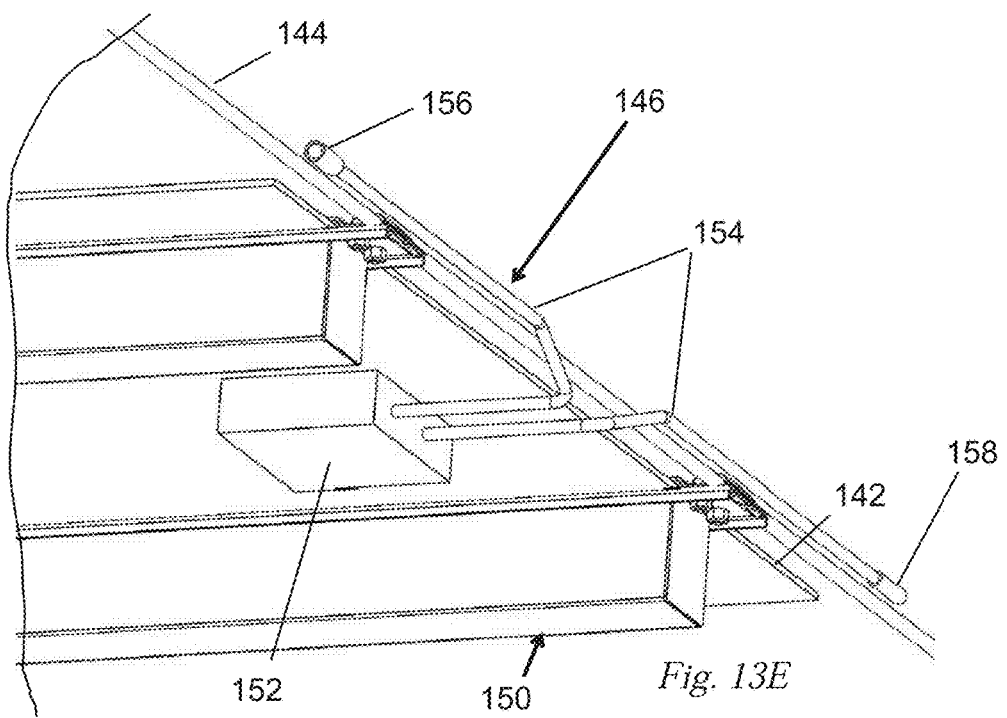

FIG. 13E shows the underside of one panel short edge 142 illustrating an electrical junction box 152 to which two bent electrical cable segments 154 attach. The segments 154 extend from the junction box 152 to just beyond the short edge 142 and then 90° in opposite directions so as to extend parallel to the short edge and closely adjacent to the support cable 144. One of the cable segments 154 has a female connector 156, while the other has a male connector 158. With reference back to FIG. 13B, adjacent electrical cable segments 154 are shown attached to one another via the mating connectors 156, 150. In this way, each individual panel 26 carries a portion of the whole electrical circuit, and the modular nature of this arrangement facilitates assembly.

FIGS. 13F-13H illustrate preferred flotation devices 150 attached to the underside of each photovoltaic panel 26. The flotation devices 150 comprise elongated floats 160 and thin, elongated metallic tracks or sheets 162 that are attached in parallel to the long edges 140 of the panels 26. As seen in FIGS. 13G and 13H, the sheets 162 extend beyond the opposite ends of the floats 160, which are formed as rectangular parallelepipeds in the illustrated embodiment. The floats 160 desirably have a length approximately equal to the length dimension of each of the panels 26 such that the sheets 162 also extend beyond the panels. The floats 160 may be sealed, hollow structures such as plastic tubes, or solid buoyant material, or a combination thereof. There are preferably at least two flotation devices 150 per panel to provide stable buoyancy to each panel.

It should be noted that the flotation devices 150 for providing local buoyancy to the array 24 of panels 26 in the "moon pool" of the floating solar system 20 could be attached to either the underside or on the upper side of the panel 26. Moreover, flotation devices could be interspersed between the panels 26, such as in the gaps G, as will be shown below. Alternatively, the frames of each of the panels 26 may be buoyant to simplify construction, though such special panels may be cost-prohibitive.

Figure 13I:
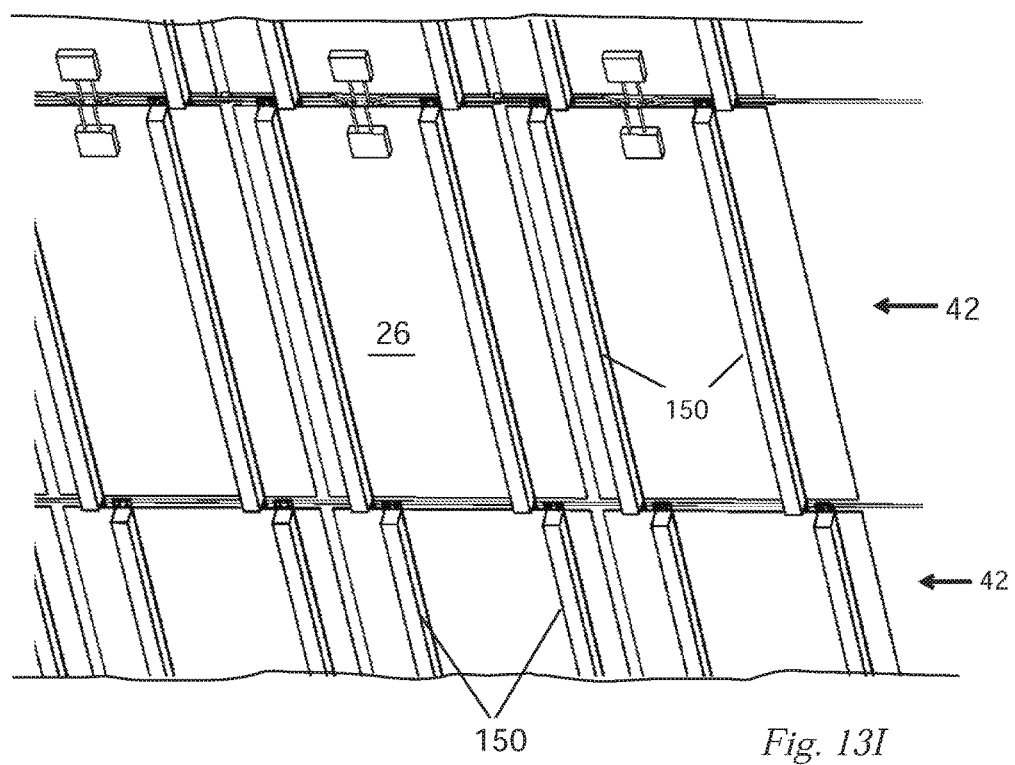
Figure 13J:
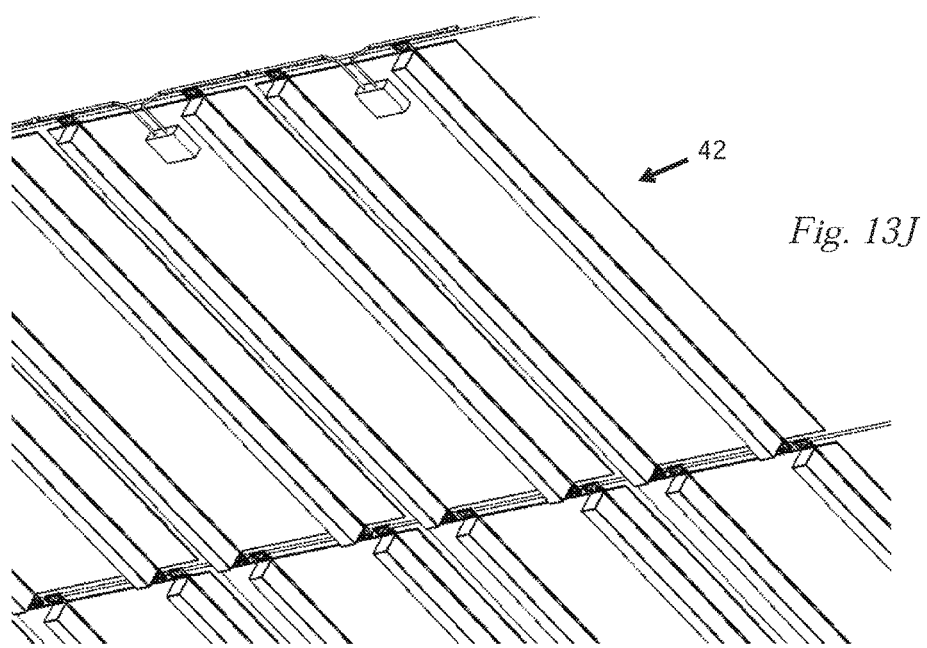

With specific reference to FIGS. 13I and 13J, the flotation devices 150 in each row 42 are attached to the underside of the respective panels 26 in a manner that is offset from the flotation devices in the adjacent rows 42. This arrangement is not unduly affect the symmetry of the buoyancy, but facilitates assembly since the proper panel for each row is easily identified. Moreover, the connections between the flotation devices 150 and the structural cable 144 and electrical cables 146 are offset between adjacent panels.

FIGS. 13K-13N illustrate one corner of a photovoltaic panel 26 showing the flotation device 150 underneath with the elongated sheets 162 projecting beyond the short edge 142 of the panel. In a preferred embodiment, the floats 160 attaches to the underside of the sheet 162 with fasteners, glue, or the like, and the sheet in turn attaches to the underside of the panel 26, typically with glue. FIG. 13L illustrates the channel-like nature of the sheets 162 with elongated side flanges to flank the float 160. The terminal ends of the sheet 162 feature adjacent slots for receiving curled fingers 170 on the outer end of the exemplary fastener bracket 148. A pair of fasteners 174 secures a midsection 176 of the bracket 148 to the sheet 160. The bracket 148 has a convex portion 178 between the fingers 170 and the midsection 176 that is sized to closely receive the structural support cable 144. In this way, the bracket 148 secures the support cable 144 with respect to the flotation device 150. The bracket 148 further includes a bent flange 180 on its inner end that rests on top of the photovoltaic panel 26 (typically on an outer metallic bezel of the panel). To help prevent damage to the panel 26, a strip of resilient material 182 such as rubber is desirably adhered to the underside of the flange 180 so as to contact the top of the panel 26.

A series of the brackets 148 are shown extending from adjacent panels 26 in FIG. 13C, securing the panels to the support cable 144. The benefit of the offset positioning of the flotation devices 150 is thus apparent. Although not shown in FIG. 13B, the electrical cables 146 at the ends of the panels 26 may be secured in parallel with the support cables 144 using brackets, ties, or the like. It should be understood that any components used to secure the solar array 24 are desirably made of non-corroding materials, such as marine quality stainless steel and the like.

FIG. 14 is a perspective view of an alternative array 190 of photovoltaic panels 192 with sequential rows 194 configured to tilt in one direction for greater sun exposure. Each panel 192 includes a pair of flotation devices 196a, 196b, with one of them being larger than the other to create the tilt in the panels 192. Adjacent rows 194 of panels may be secured together using rigid or flexible tethers 198. If tilted arrays 190 of panels are used, the entire floating solar system should be capable of rotating so as to face the tilted panels toward the sun as it crosses the sky. Alternatively, the array 190 of panels may be rotated within the surrounding pontoon. As mentioned above, tilted arrays of panels may be necessary in regions of latitude outside the Tropics.

Figures 15, 15A, 15B:
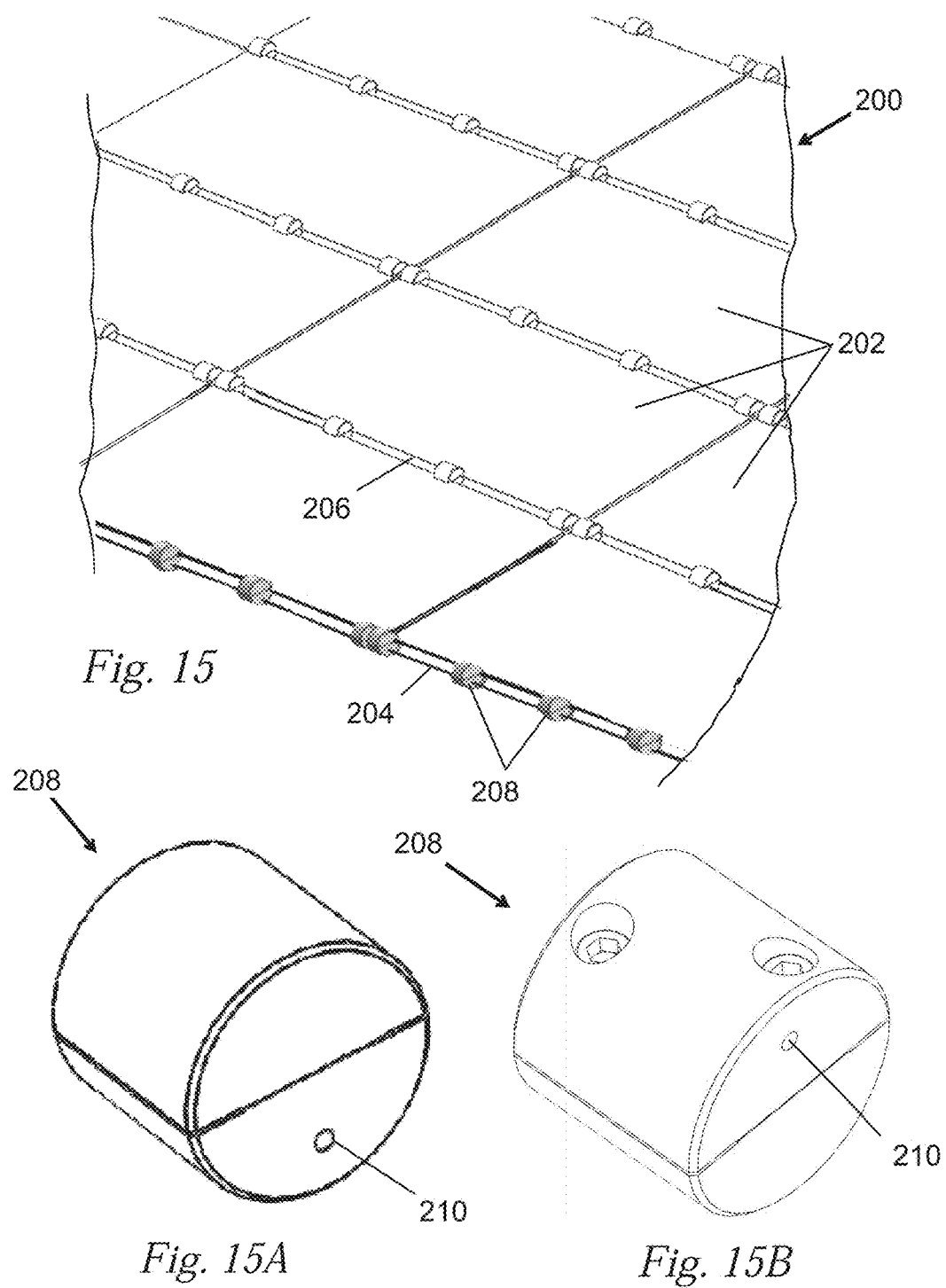
FIG. 15 is a perspective view of a portion of an array of photovoltaic panels laid flat with an alternative arrangement of connecting cables and floats.
FIGS. 15A and 15B are perspective views of an individual float used in the arrays of FIGS. 15 and 15C.

FIG. 15 is a perspective view of a portion of a solar array 200 of photovoltaic panels 202 laid flat with an alternative arrangement of connecting cables and floats. More particularly, cables 204 extended in the gaps between long sides 206 of the panels 202 and a series of cylindrical floats 208 are secured thereto. The floats 208 are shown in detail in FIGS. 15A and 15B, and preferably comprise two semi-cylinders one of which has a throughbore 210 for a receiving the cables 204. Each of the floats 208 may also be secured on the edges of adjacent panels 202, or brackets such as described above at 148 may be used to secure the panels to be cables 204. This embodiment serves to illustrate that the panels 202 in the array 200 may be supported by flotation devices attached to each panel, or by separate flotation devices that extend between the panels. In either case, the flotation devices interspersed throughout the solar array 200 provide local buoyancy thereto, while the structural cables 204 attached to the outer buoyant pontoon provide global buoyancy.

Figure 15C:
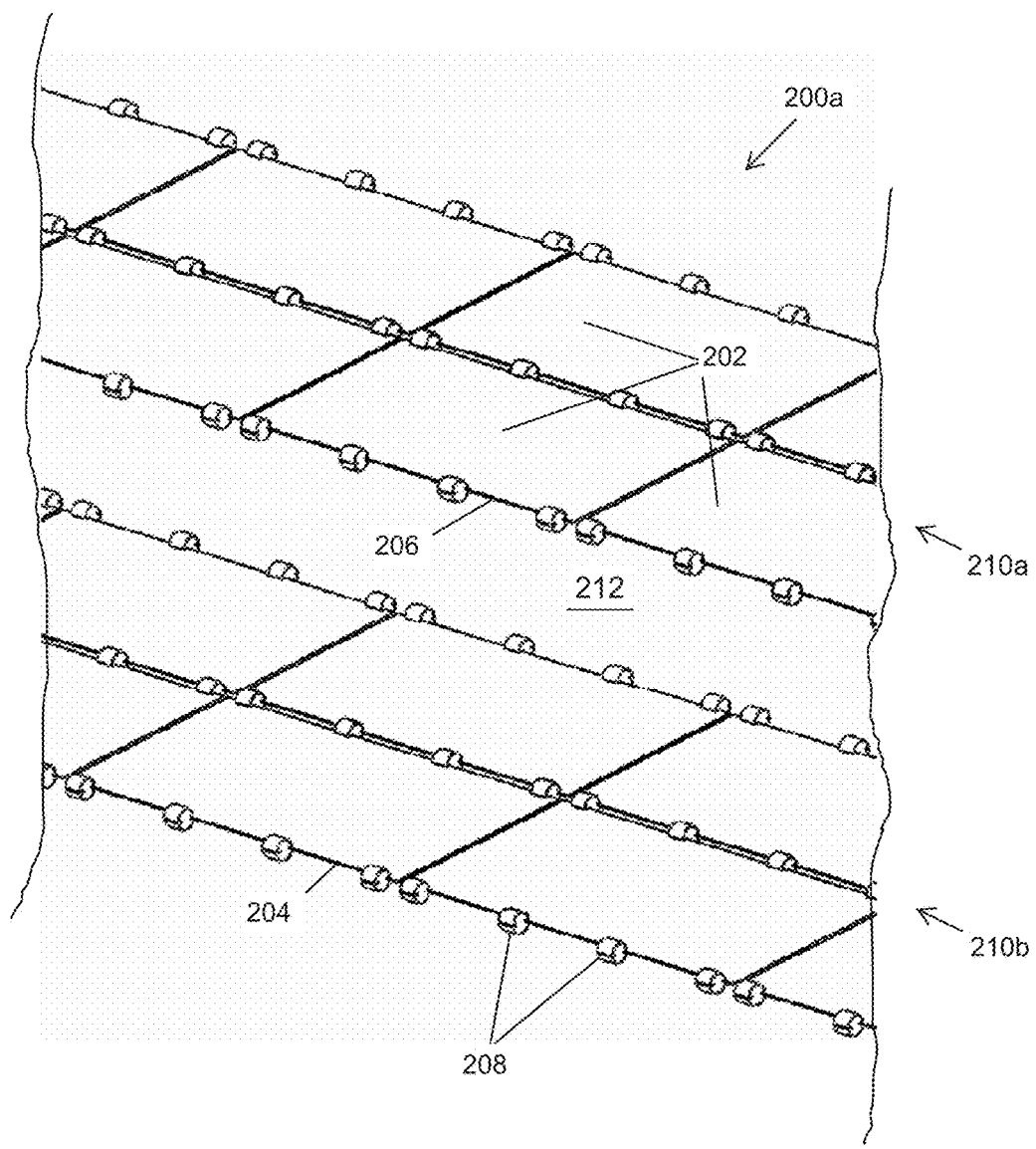
FIG. 15C is a portion of a modified solar array similar to that shown in FIG. 15, with parallel paired rows of photovoltaic panels.

FIG. 15C is a portion of a modified solar array 200a similar to that shown in FIG. 15, with photovoltaic panels 202 supported by a series of cylindrical floats 208 secured thereto. However, instead of a continuous array of evenly spaced panels 202, the array 200a includes parallel paired rows of panels 210a, 212b separated by a gap 212 sized approximately the width of one of the panels. This provides some intervening space for rotating the parallel paired rows of panels 210a, 212b without risk of contact therebetween.

Figure 16B:
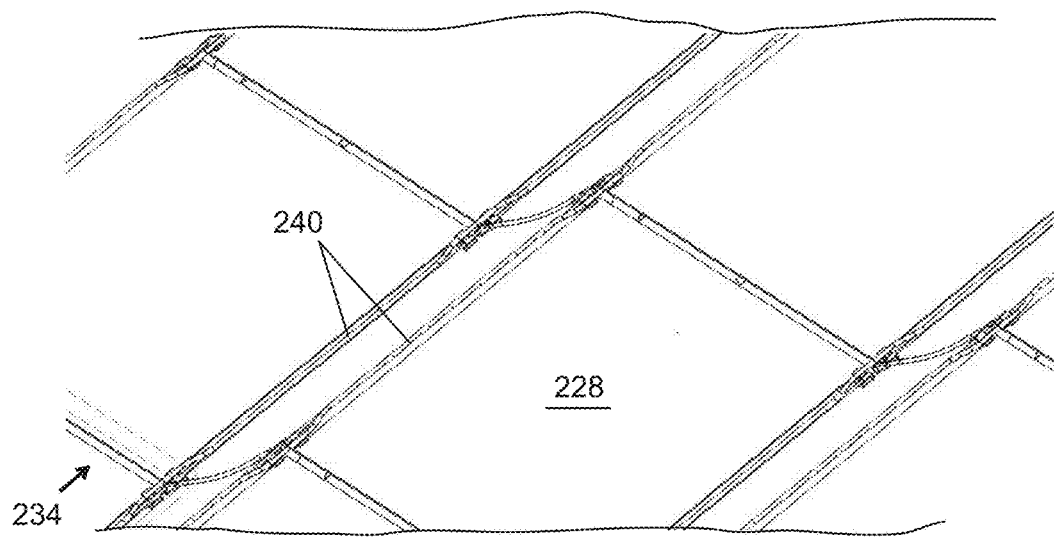
Figure 16C:
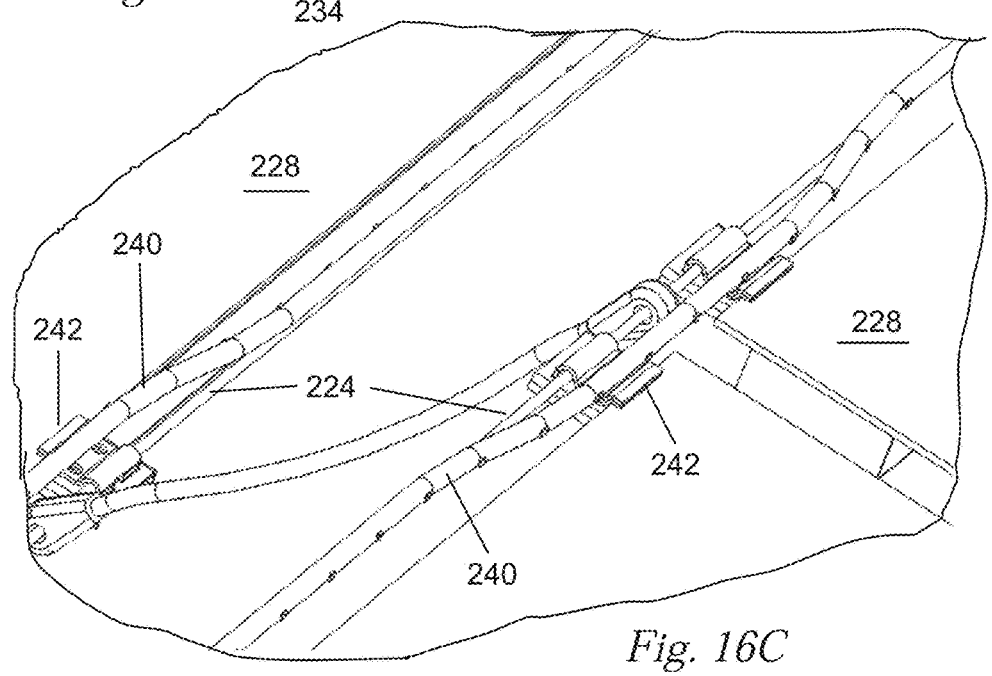

FIGS. 16A-16C are perspective views of an alternative configuration of the floating solar system showing one possible option for preventing growth of algae and other fouling matter. FIG. 16A shows an inner side of a pontoon 220 having a pair of inwardly directed flanges 222a, 222b fastened thereto and vertically spaced apart. The flanges 222a, 222b are similar to the flange 102 shown in FIGS. 6-7 and each include a plurality of grommets (not shown) for attaching a plurality of structural cables 224 that support a solar array 226 of individual panels 228. In particular, the ends of the structural cables 224 attached to the flanges 222a, 222b via V-shaped brackets 230, and the cables 224 may be pulled taut and secured by a cinch assembly 232, or the like.

The structural cables 224 are shown extending along the long sides of each rectangular panel 228, or in other words along each side of each column 234 of panels in the array 226. In contrast to the earlier embodiment, there are two structural cables 224 per column 234 of panels. The reader will notice that the cable 224 running along one side of any one column 234 attaches to an upper flange 222a, while the cable running along the other side of that column attaches to a lower flange 222b. In this way, the panels 228 in each successive column 234 are supported in a tilted orientation to better capture the sunlight. This is an alternative to tilting the panels using asymmetric flotation devices. Of course, the UV light ropes 240 can also be used with a flat array of panels.

Now with reference to FIGS. 16B and 16C, a series of UV light ropes 240 are shown extending along the long edges of each of the panels 228. In a flat array, the light ropes 240 extend along the gaps between the columns 234 of panels 228. The UV light ropes 240 are preferably supported by the structural cables 224 such as by using brackets 242 that also secure the cables 224 to the panels 228. Alternatively, the UV light ropes 240 maybe secured along the structural cables 224 using plastic clips, ties, or the like. The UV light ropes 240 are preferably flexible polymer hoses containing a series of ultraviolet LED lights. The wattage may vary, and the LEDs are water-resistant.

FIG. 17A shows a step in assembly of a floating solar system 250 utilizing a corrugated inflatable mattress 252 shown in FIG. 17B. The floating solar system 250 is assembled by arranging a pontoon 254 around the mattress 252, which has a generally circular shape which corresponds to the internal shape defined by the pontoon. The mattress 252 is initially uninflated and defines a series of parallel linear corrugations 256 (or alternating ribs and grooves). The structural cables 258 that span across the interior of the pontoon 254 are then attached. The spacing of the cables 258 matches the spacing between the corrugations 256 such that the mattress 252 helps align the cables. In general, the mattress 252 may have a specific shape to facilitate the positioning of the metallic cables. At this stage, technicians assemble the photovoltaic panels (not shown) along the cables 258. Because the mattress 252 is not inflated, the technicians can walk across the partially assembled solar unit 250. The panels may be assembled on a beach or in a dry dock, but preferably a location that is adjacent to the body of water in which the floating solar system 250 will be deployed.

Subsequently, the mattress 252 is inflated after all the panels have been fixed to allow tugging of the whole structure. FIG. 18 illustrates a tug boat deploying one of the floating solar systems 250, and FIG. 18A is a sectional view showing the corrugated mattress 252 inflated under the array 260 of photovoltaic panels. After reaching the deployment location, the mattress 252 may be deflated and removed.

While the invention has been described in its preferred embodiments, it is to be understood that the words which have been used are words of description and not of limitation. Therefore, changes may be made within the appended claims without departing from the true scope of the invention.

What is claimed is:

1. A floating solar system, comprising:
a border pontoon adapted to float on water defining a closed peripheral shape surrounding an interior space;
an array of interconnected photovoltaic panels distributed within the peripheral shape and structurally supported by support cables extending across between sides of the pontoon so as to span the interior space, each photovoltaic panel having a flotation device secured thereto so that the array is at least partially buoyant, the photovoltaic panels being electrically connected; and
a stabilizing skirt downwardly-depending from the border pontoon to surround a column of water underneath the array of photovoltaic panels, the skirt being weighted to remain substantially vertical in the water and forming a barrier around the column of water so as to create a more stable volume of water within the peripheral shape than outside of the border pontoon, wherein the skirt has a depth that is between about 10-40% of the width of the closed peripheral shape.

2. The floating solar system of claim 1, wherein the flotation device comprises at least two elongated floats attached underneath each photovoltaic panel.

3. The floating solar system of claim 2, wherein the photovoltaic panels are angled from the horizontal by providing two of the elongated floats that are differently-sized.

4. The floating solar system of claim 1, wherein the flotation devices comprise buoys that are attached to the cables between photovoltaic panels.

5. The floating solar system of claim 1, wherein the stabilizing skirt is rigidified with interconnected horizontal and vertical tubes made of a material having a higher density than water.

6. The floating solar system of claim 1, wherein the closed peripheral shape is a polygon with straight sides and the skirt is formed of a plurality of solid vertical panels equal to the number of sides connected together by struts and vertex connectors at corners between the panels.

7. The floating solar system of claim 1, wherein the pontoon comprises tubular members made of high density polyethylene.

8. The floating solar system of claim 1, wherein the pontoon comprises tubular inflatable members.

9. The floating solar system of claim 1, wherein the pontoon comprises tubular members partly filled with water for ballast.

10. The floating solar system of claim 1, further including a series of UV light ropes extending within gaps between individual photovoltaic panels and supported by the support cables.

11. A floating solar system, comprising:
a border pontoon adapted to float on water defining a closed peripheral shape surrounding an interior space;
an array of interconnected photovoltaic panels structurally connected together within the peripheral shape, each photovoltaic panel having a flotation device secured thereto so that the array is at least partially buoyant, the photovoltaic panels being electrically connected; and
a stabilizing skirt downwardly-depending from the border pontoon to surround a column of water underneath the array of photovoltaic panels, the skirt having a plurality of struts supporting solid vertical panels therebetween, the struts made of a material having a higher density than water, the skirt thus forming a barrier around the column of water and creating a more stable volume of water within the peripheral shape than outside of the border pontoon.

12. The floating solar system of claim 11, wherein the flotation device comprises at least two elongated floats attached underneath each photovoltaic panel.

13. The floating solar system of claim 11, wherein the photovoltaic panels are angled from the horizontal.

14. The floating solar system of claim 11, wherein the flotation devices comprise buoys that are attached to the cables between photovoltaic panels.

15. The floating solar system of claim 11, wherein the photovoltaic panels are attached with elongated metallic tracks attached in parallel to one edge of the panels.

16. The floating solar system of claim 11, wherein the struts comprise horizontal and vertical tubes that are flexibly connected so as to allow the skirt to deform with the sea currents.

17. The floating solar system of claim 11, wherein the skirt has a depth that is between about 10-40% of the width of the closed peripheral shape.

18. The floating solar system of claim 11, wherein the pontoons are selected from the group consisting of tubular members made of high density polyethylene and tubular inflatable members.

19. The floating solar system of claim 11, wherein the pontoons comprises tubular members partly filled with water for ballast.

20. The floating solar system of claim 11, further including a series of UV light ropes extending within gaps between individual photovoltaic panels and supported by the support cables.

* * * * *